US008488774B2

(12) United States Patent
Mahalaha et al.

(10) Patent No.: US 8,488,774 B2
(45) Date of Patent: Jul. 16, 2013

(54) PREDICTIVE CALL ROUTING

(75) Inventors: Anil Mahalaha, Medway, MA (US); Daniel L. Tonelli, Hopkinton, MA (US); Barry Berk, Cambridge, MA (US)

(73) Assignee: FMR LLC, Boston, MA (US)

( * ) Notice: Subject to any disclaimer, the term of this patent is extended or adjusted under 35 U.S.C. 154(b) by 1697 days.

(21) Appl. No.: 11/781,906

(22) Filed: Jul. 23, 2007

(65) Prior Publication Data

US 2008/0095355 A1 Apr. 24, 2008

Related U.S. Application Data

(60) Provisional application No. 60/832,885, filed on Jul. 24, 2006.

(51) Int. Cl.
*H04M 3/00* (2006.01)

(52) U.S. Cl.
USPC ............... 379/265.13; 379/265.01; 379/266.1

(58) Field of Classification Search
USPC .............. 379/265.01, 265.02, 265.06, 265.09
See application file for complete search history.

(56) References Cited

U.S. PATENT DOCUMENTS 5,825,869 A * 10/1998 Brooks et al. ............ 379/265.12
6,389,400 B1 * 5/2002 Bushey et al. ............... 705/7.14
6,879,683 B1 * 4/2005 Fain et al. ................ 379/265.02
7,418,095 B2 * 8/2008 Knott et al. .............. 379/266.06
8,238,541 B1 * 8/2012 Kalavar .................... 379/265.06
2004/0247092 A1 * 12/2004 Timmins et al. ........... 379/88.16
2005/0069102 A1 * 3/2005 Chang ........................ 379/88.18
2007/0160054 A1 * 7/2007 Shaffer et al. .............. 370/395.2

OTHER PUBLICATIONS

"Avaya Business Advocate", Avaya Inc., 2002 (3 pgs.).
"Genesys' Enterprise Routing Solution. Intelligent Interaction Routing to Enhance Customer Satisfaction Throughout the Enterprise", Genesys Telecommunications Laboratories, Inc., white paper, 2002 (15 pgs.).
Cisco Advanced Call Center Routing Services [online], [retrieved on Jul. 23, 2007]. Retrieved from the Internet: <URL: http://www.cisco.com/en/US/products/sw/custcosw/ps1973/ps4097/index.html>.

* cited by examiner

*Primary Examiner* — Fan Tsang
*Assistant Examiner* — Jirapon Intavong
(74) *Attorney, Agent, or Firm* — Fish & Richardson P.C.

(57) ABSTRACT

A predictive call routing system that includes a real-time decision engine to receive information about a customer and identify a skill that is useful for providing service to the caller. The decision engine identifies the skill by generating scores for a plurality of statistical models using the statistical models and parameters associated with the caller, each statistical model representing a correlation between a subset of parameters and an action that may be performed or requested to be performed by the caller, the score for each statistical model being generated using the statistical model and the subset of parameters associated with the statistical model, and identifies a skill based on the scores. The system includes a call router to route a call from the customer to a representative who has the skill.

37 Claims, 11 Drawing Sheets

PREDICTIVE CALL ROUTING

RELATED APPLICATION

This applications claims the benefit of U.S. Provisional Application No. 60/832,885, titled "Predictive Call Routing", filed Jul. 24, 2006, the content of which is incorporated by reference.

BACKGROUND

This invention relates to predictive call routing.

Many corporations have call centers or contact centers that respond to telephone calls from customers. A contact center may have a call routing system that routes the customer telephone calls to agents or representatives based on business rules. For example, the company may segment its service offerings by customer type (premium, regular, or new) and language (English or Spanish). A business rule may specify that 70% of normal customers should be routed to a human representative within 50 seconds, and 90% of premium customers should be routed to a human representative within 30 seconds. The business rules may specify that calls from English or Spanish speaking customers be routed to representatives having appropriate language skills.

In some examples, upon receiving a telephone call from a customer, the call routing system invokes an interactive voice response module that greets the customer with a welcome message and asks the customer for his/her account information. Upon receiving the account information, the interactive voice response module provides the customer with a menu of service items, and an option to connect to a human representative. When using the automated system, the customer may have to navigate several layers of sub-menus in order to obtain the desired service. If the user opts to speak, to a human representative, the call routing system retrieves customer account information and routes the call to a representative using predefined business rules. If the representative who answers the call does not possess the required skills to service the customer, the representative looks up a phone directory or database to find another representative who may have the proper skills for servicing the customer. The customer may be placed on hold while the first representative explains the customer's problems to the second representative. The first representative then transfers the call to the second representative, and the second representative proceeds to solve the customer's problems.

SUMMARY

In one aspect, in general, a method of predictive call routing includes, at a call routing system, receiving a telephone call from a caller, generating scores for a plurality of statistical models using the statistical models and parameters associated with the caller, each statistical model representing a correlation between a subset of parameters and an action, the score for each statistical model being generated using the statistical model and the subset of parameters associated with the statistical model, selecting a representative based on the scores, and routing the call to the selected representative.

Implementations of the method may include one or more of the following features. Selecting a representative includes selecting a statistical model based on the scores and predetermined rules. Selecting a representative includes mapping the selected statistical model to a skill, and selecting the representative based on the skill. The skill is useful in performing the action. Mapping the selected statistical model to a skill includes using predetermined rides to map the selected statistical model to a skill. Mapping the selected statistical model to a skill includes using a second layer of statistical analyses, the second layer of statistical analyses including generating a second set of scores for a plurality of second statistical models, each second statistical model being associated with a skill, and mapping the selected statistical model the a skill based on the second set of scores.

The score for each statistical model provides information about a probability that the caller will perform an action associated with the statistical model or request the action to be performed. The statistical models are derived from information collected on people who have previously called using telephone numbers that are handled by the call routing system. The statistical model associated with a particular action is derived by finding previous calls that are associated with the particular action, and analyzing parameters of the callers to determine which subset of parameters correlate to the particular action. Generating scores for the plurality of statistical models includes generating scores for some of the statistical models, in which the statistical models include nested layers of statistical models, each model being linked to one or more models in the next layer. The action includes at least one of requesting information, opening an account, updating account information, and performing a transaction with respect to an account. The method includes receiving a feedback indicating whether it was proper to route the call to the selected representative. The method includes updating the statistical models based on the feedback. The method includes generating and broadcasting a personalized message to the caller while placing the caller on hold and waiting for a representative, wherein the personalized message is generated based on the scores.

The parameters associated with the caller includes at least one of age of the caller, gender of the caller, marital status of the caller, assets in the caller's account, number of previous calls from the caller within a predetermined number of days, number of days since a promotional material was sent to the caller, whether the caller has visited particular web pages, and language preferences of the caller. The method includes searching a database having information about representatives, skills of the representatives, and proficiency of the representatives with respect to the skills. The parameters include whether the caller has a financial plan that is the subject of a news article published within a predetermined number of days. The selection of a representative is intended to maintain a freshness of training for the representative by distributing calls among representatives.

In another aspect, in general, a method for establishing a statistical model used in predictive call routing includes collecting information about past callers who have called one or more specified telephone numbers and performed an action or requested the action to be performed, analyzing the information to determine which parameters of the callers correlate to the action, and establishing a statistical model based on the parameters that correlate to the action. A score that is generated by using the statistical model and parameters of a caller provides information about a probability that the caller will perform the action or request the action to be performed.

In another aspect, in general, a method includes receiving a call from a customer and generating scores for a plurality of statistical models using the statistical models and parameters associated with the customer, each statistical model representing a correlation between a subset of parameters and an action, the score for each statistical model being generated using the statistical model and the subset of parameters associated with the statistical model. The method includes providing, based on the scores, a group of service options to the customer and prompting the customer to select an option from the group of service options.

In another aspect, in general, a method includes receiving a telephone call from a customer, generating scores for a plurality of statistical models using the statistical models and parameters associated with the caller, each statistical model representing a correlation between a subset of parameters and an action, the score for each statistical model being generated using the statistical model and the subset of parameters associated with the statistical model, and generating an e-mail response based on the scores. A voice message is generated to tell the customer that an e-mail having information useful to the customer will be sent to the customer.

In another aspect, in general, a method includes receiving a telephone call from a customer, generating scores for a plurality of statistical models using the statistical models and parameters associated with the caller, each statistical model representing a correlation between a subset of parameters and an action, the score for each statistical model being generated using the statistical model and the subset of parameters associated with the statistical model, and determining a criterion based on the scores. The method includes, upon determining that a representative meeting the criterion is not currently available, generating a voice message to tell the customer that a representative will call back at a later time, and prompting the customer to provide a time and date for the representative to call back.

In another aspect, in general, a method of predictive call routing includes receiving a call from a customer, broadcasting options of a main menu to the customer, and upon receiving a customer selection indicating that the customer wishes to speak to a representative, providing a tutorial to the customer. The tutorial is selected based on scores that are generated using a plurality of statistical models and parameters associated with the customer, each statistical model representing a correlation between a subset of parameters and an action, the score for each statistical model being generated using the statistical model and the subset of parameters associated with the statistical model. The method includes transferring the call to a representative and notifying the representative that the customer has been given the tutorial.

In another aspect, in general, a method includes determining a skill of a representative for servicing a customer using two layers statistical modeling, wherein the first layer of statistical modeling provides estimations of actions that the customer is likely to perform or request to be performed, and the second layer of statistical modeling provides estimations of skills that are likely useful in performing the actions.

Implementations of the method may include one or more of the following features. The method includes determining a proficiency level of the skill also using the two layers statistical modeling.

In another aspect, in general, a method includes choosing one option out of a plurality of options based on at least two layers of statistical modeling. The first layer of statistical modeling includes generating a first set of scores for a first set of statistical models using the first set of statistical models and a first set of parameters, the score for each of the first set of statistical models being generated using the statistical model and a subset of the first set of parameters associated with the statistical model. The second layer of statistical modeling includes generating a second set of scores for a second set of statistical models using the second set of statistical models and a second set of parameters, the second set of parameters including at least one of the first set of scores, the score for each of the second set of statistical models being generated using the statistical model and a subset of second set of parameters associated with the statistical model, and choosing the option based on the second set of scores.

Implementations of the method may include one or more of the following features. Choosing one option from among the plurality of options includes selecting a representative from among a plurality of representatives, the selected representative having the skill and proficiency level for servicing a caller.

In another aspect, in general, a predictive call routing system includes a real-time decision engine to receive information about a customer and identify a skill that is useful for providing service to the caller, and a call router to route a call from the customer to a representative who has the skill. The decision engine identifies the skill bygenerating scores for a plurality of statistical models using the statistical models and parameters associated with the caller, and identifying a skill based on the scores. Each statistical model represents a correlation between a subset of parameters and an action that may be performed or requested to be performed by the caller, the score for each statistical model being generated using the statistical model and the subset of parameters associated with the statistical model.

Implementations of the system may include one or more of the following features. The system includes a storage to store a database having information about customers. The system includes a storage to store a database having information about representatives and skills associated with the representatives. The decision engine is configured to establish a statistical model associated with a particular action by finding previous calls that are associated with the particular action, and finding parameters of callers to determine which subset of parameters correlate to the particular action. The plurality of statistical models include nested layers of statistical models, each model being linked to one or more models in the next layer. Identifying the skill based on the scores includes using a second layer of statistical modeling to determine the skill based on the scores. The second layer of statistical modeling includes generating scores for a second set of plurality of statistical models, each of the second set of statistical models representing a correlation between a statistical model in the first layer, a subset of the plurality of parameters, and a skill that may be useful for providing service to the caller that performs or requests the action associated with the statistical model in the first layer.

In another aspect, in general, a call routing system includes a real-time decision engine to receive information about a caller and identify a group of service options that are useful to the caller. The decision engine identifying the service options by generating scores for a plurality of statistical models using the statistical models and parameters associated with the caller, each statistical model representing a correlation between a subset of parameters and an action that may be performed or requested to be performed by the caller, the score for each statistical model being generated using the statistical model and the subset of parameters associated with the statistical model, and identifying the service options based on the scores. The system includes an interactive voice response system to provide the service options to the caller and prompt the caller to select one of the service options.

The systems and methods can have one or more of the following advantages. The predictive call routing system can more accurately determine what skill set and proficiency level are required to service a caller, and connect the caller with a representative having the appropriate skill set and proficiency level. The waiting time for the caller can be reduced. The representative can be better prepared to answer questions from the caller, as the system can more accurately predict what information the caller needs. Customers satisfaction can be increased due to reduced waiting time and better service from knowledgeable representatives. Other features and advantages of the invention are apparent from the following description, and from the claims.

DESCRIPTION

System Architecture

Figure 1:
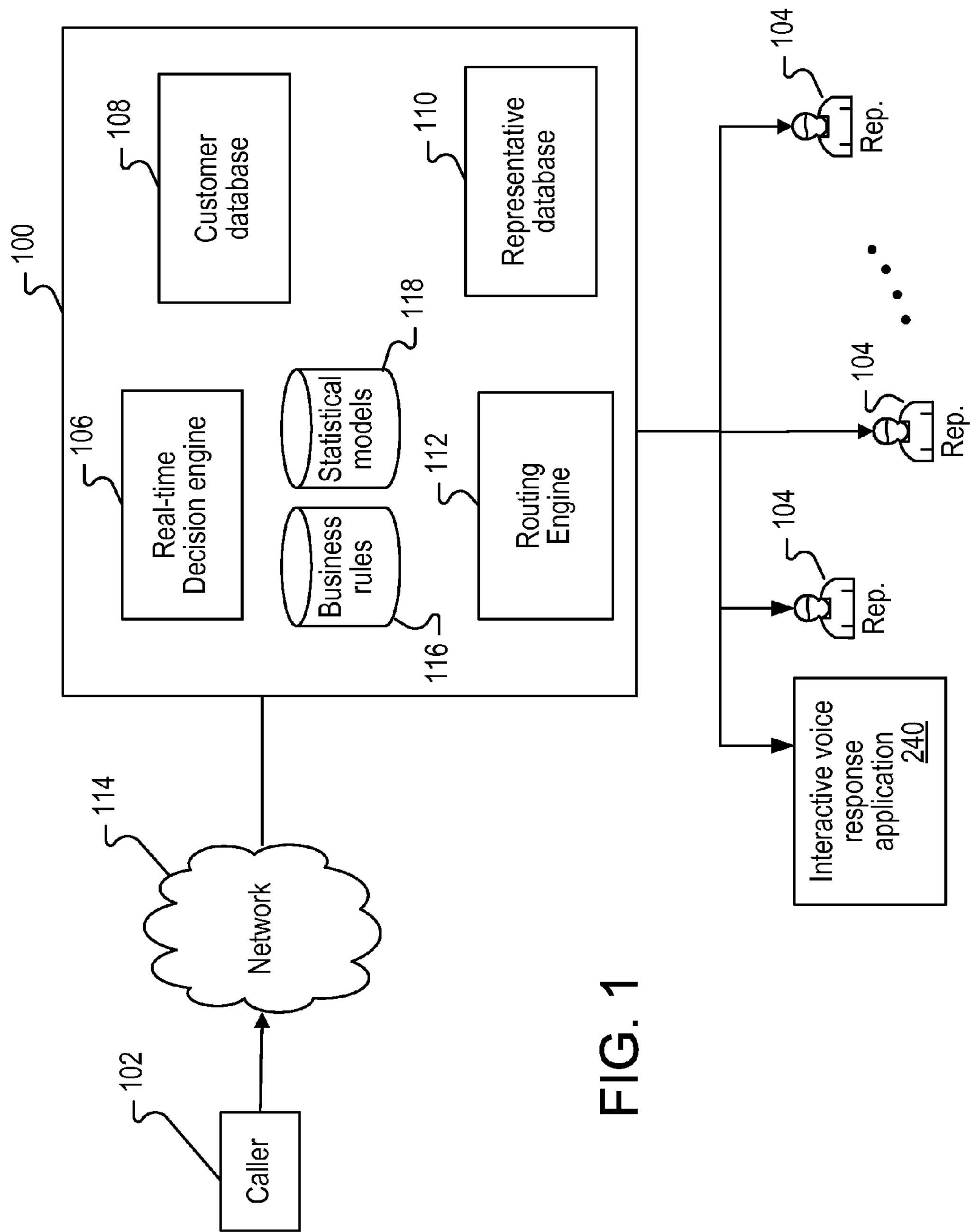
FIG. 1 is a block diagram of a predictive call routing system and an environment for operating the system.

FIG. 1 shows a block diagram of a predictive call routing system 100 that routes telephone calls from callers 102 (customers) to representatives 104 (customer service representatives) based on decisions made by a real-time decision engine 106. The callers 102 are connected to the system 100 through a network 114. The decision engine 106 uses both business rules 116 and statistical modeling to predict one or more services that the caller 102 may be requesting during the call. The business rules 116 are predefined rules that have been written based on business logic. The statistical modeling uses statistical models 118 generated by analyzing vast amounts of information gathered from past calling records, each statistical model being associated with an action. Each statistical model 118 can be viewed as representing past callers who have called, in which the calls resulted in a particular action being performed. The action can be, for example, a request for information, a request to open an account, or a request to perform a transaction with respect to an account.

For example, one statistical model may represent customers who have requested to open stock brokerage accounts. Another statistical model may represent customers who requested guidance about retirement financial planning. By applying (or matching) parameters associated with a caller to the statistical models to determine which model more accurately describes the caller, the system 100 can more accurately predict the needs of the caller 102 and better route the telephone call to a representative who has the appropriate skills and proficiency levels for servicing the caller 102.

The description below describes an example in which the call routing system 100 belongs to a company that provides financial products and services to customers.

For example, a statistical model may be associated with a request to open a stock brokerage account. The statistical model can be established by, e.g., retrieving past call records and search for customers who have called to open stock brokerage accounts, comparing information of those customers, and finding similarities among those customers. The system 100 may collect 500 parameters about each customer, and determine that there are 50 parameters that have similarities (such as having similar ranges of values) among at least some of the customers who called to open stock brokerage accounts. This indicates that there are correlations between the 50 parameters and the request to open stock brokerage accounts.

For example, the system 100 may determine that, at least some of these customers all have money above a certain value in their accounts, at least some of the customers have logged into their accounts on the company web site and browsed web pages related to stock trading, and at least some of the customers received e-mails or printed promotional materials related to stock trading within certain days of the call. Therefore, the amount of money in the caller's account, how often the caller has logged into his/her account on the company web site and browsed web pages related to stock trading, and how many days since the last time that the caller received e-mails or printed promotional materials related to stock trading, may all be parameters that are relevant to predicting whether the caller is calling to open a stock brokerage account.

A statistical model 118 representing customers who called to open a stock brokerage account can be established using these 50 parameters and the values of the 50 parameters of people who have called in the past, to open stock brokerage accounts. When the system 100 receives a new telephone call, the system 100 retrieves the 50 parameters associated with the caller and applies the 50 parameters to the statistical model 118 to determine a probability score. If the probability score is above a preset threshold, indicating there is a high likelihood of a match between the caller and the model, the system 100 determines that there is a high likelihood that the caller is calling about opening a stock brokerage account. Conversely, if the probability score is below the preset threshold, indicating there is a low likelihood of a match between the caller and the model, the system 100 determines that there is a low likelihood that the caller is calling about opening a stock brokerage account.

Similarly, the system 100 may determine that, based on currently available data, there are 20 parameters that may be relevant to determining whether a call is to request retirement financial planning. These 20 parameters may include, for example, the age and gender of the customers, the amount of money in their accounts, whether they have logged into his/her account in the company web site and used an on-line financial planning tool, and whether they received e-mails or printed promotional materials related to retirement planning.

A statistical model 118 representing customers who called to request guidance in retirement planning can be established using these 20 parameters and the values of these 20 parameters of people who have called in the past to request retirement financial planning. When the system 300 receives a new telephone call, the system 100 retrieves the 20 parameters associated with the caller and applies the 20 parameters to the statistical model 118 to determine a probability score to determine the likelihood that the caller is calling to request guidance in retirement, financial planning By applying parameters associated with the caller 102 to different models (different sets of parameters may be used for different models), the system 100 finds a model with a highest probability score, indicating the highest likelihood that the caller 102 is calling about a service associated with the model, and routes the call accordingly.

Table 1 is an example of a list of information about customers that are collected by the system 100. Each item in Table 1 may include one or more parameters.

TABLE 1

| |
|---|
| Address |
| Demographics |
| Portfolio Information |
| Account Positions |
| Trade Activity |
| Money Transfer Information |
| Brokerage Accounts |
| Retirement Accounts |
| Savings and Retirement |
| Health and Insurance |
| Beneficiaries |
| Preferences |
| Watch List |
| Alerts |
| Stock Option Plan |
| Electronic Fund Transfers |
| Contributions |
| Exchanges |
| Call History |
| Check History |
| Web Clicks |
| USPS mailings |
| Emails |

The list may be updated over time as the system 100 changes the information collected from the customers.

The statistical models 118 can be updated as more information is available to the system 100. The parameters associated with each statistical model 118 may change, and how the parameters are used in the statistical model 118 may also change. For example, initial data may indicate that age and dollar amount in account are factors relevant to whether the caller 102 is calling about guidance in retirement financial planning, and that people over X1 years of age with accounts over Y1 dollar amount have higher likelihoods of calling about retirement financial planning. After receiving additional calls from customers requesting retirement financial planning guidance, data from the additional calls may indicate that people over X2 years of age with accounts over Y2 dollar amount have higher likelihoods of calling about retirement financial planning. The system 100 includes a feedback mechanism, described later, for providing feedback and updating the statistical models 118.

The system 100 includes a customer database 108 that stores information about customers, and a representative database 110 that stores information about representatives. The information about customers may include, e.g., the parameters that the system 100 collects about the customer. The information about representatives may include, e.g., the skills possessed by the representatives and the proficiency levels with respect to each skill, whether the representative is currently logged on the system, and whether the representative is currently servicing a caller 102.

The decision engine 106 uses both business tides and statistical modeling to predict one or more services that the caller 302 may request during the call. The number of factors considered using statistical modeling can be more than the number of factors considered by a rules based decision engine.

The system 100 includes a routing engine 112 that has information about the representatives who are logged on to the system, and whether the representatives are currently servicing other customers.

When a call from a customer 102 is received at the system 100, the decision engine 106 predicts the service(s) needed by the caller 102 based on parameters associated with the caller 102 (e.g., demographical information and account information) and statistical models 118, and determines a skill set and proficiency level that is suitable for servicing the needs of the caller 302. The routing engine 112 selects a representative 104 who is available and has the appropriate skill set based on data stored in the representative database 110. The routing engine 112 then routes the call from the caller 102 to the selected representative 104.

The routing engine 112 may also route the call from the caller 102 to an interactive voice response application 240, which can be, e.g., a VoiceXML application that directs interactions or dialogues between an interactive voice response system (e.g., 152 of FIG. 5) and the caller 102.

An advantage of using the decision engine 106 is that the system 100 can more accurately determine what skill set and proficiency level are required to service the caller 102, and connect the caller 102 with a representative 104 having the appropriate skill set (as compared to conventional systems that only use business rules and do not use statistical modeling).

A feature of the decision engine 106 is that a large number of factors can be analyzed in predicting the needs of the customer. A software engineer who designs the system 100 does not need to know in advance in detail which factors are relevant. The software engineer can use statistical analysis software to analyze a large set of data gathered from past calling history of customers, and find correlation between information about the customers and the routing of the calls.

Figure 2:
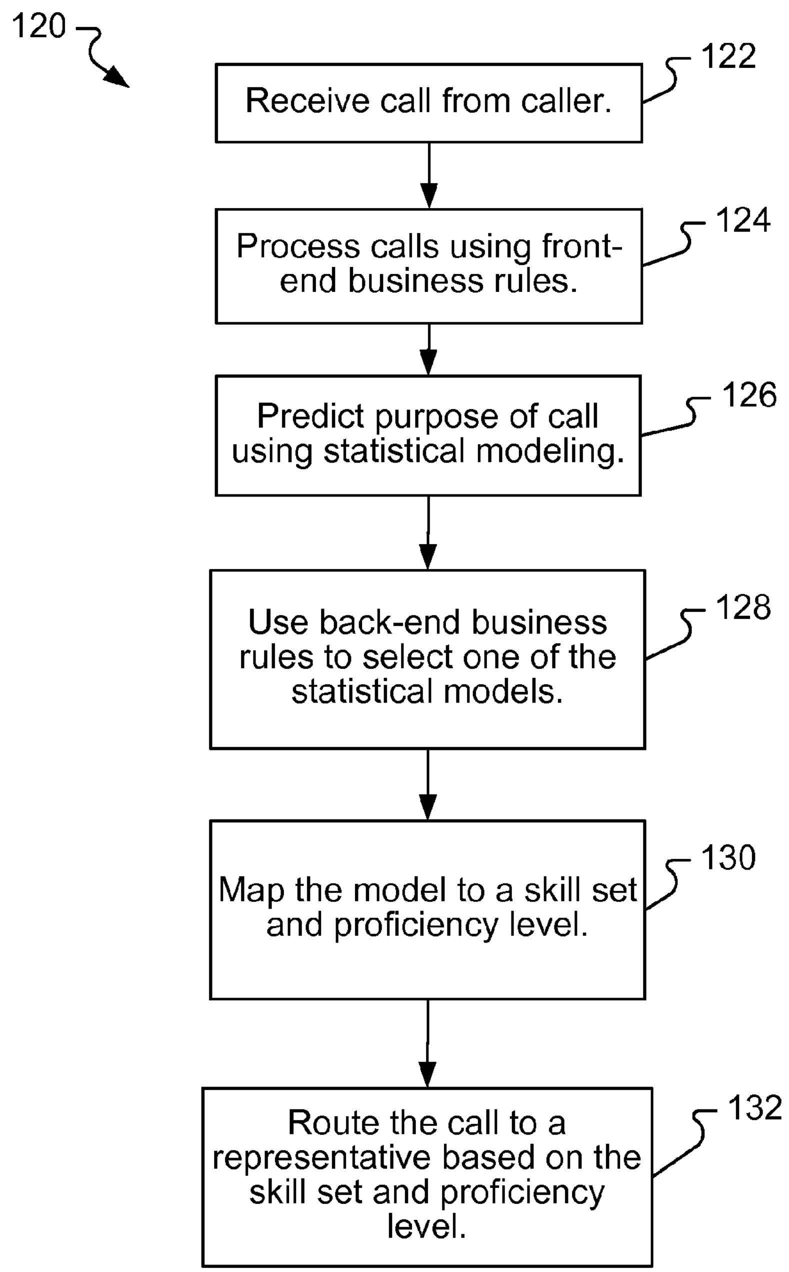
FIG. 2 is a flow diagram of a process for routing calls.
Figure 3:
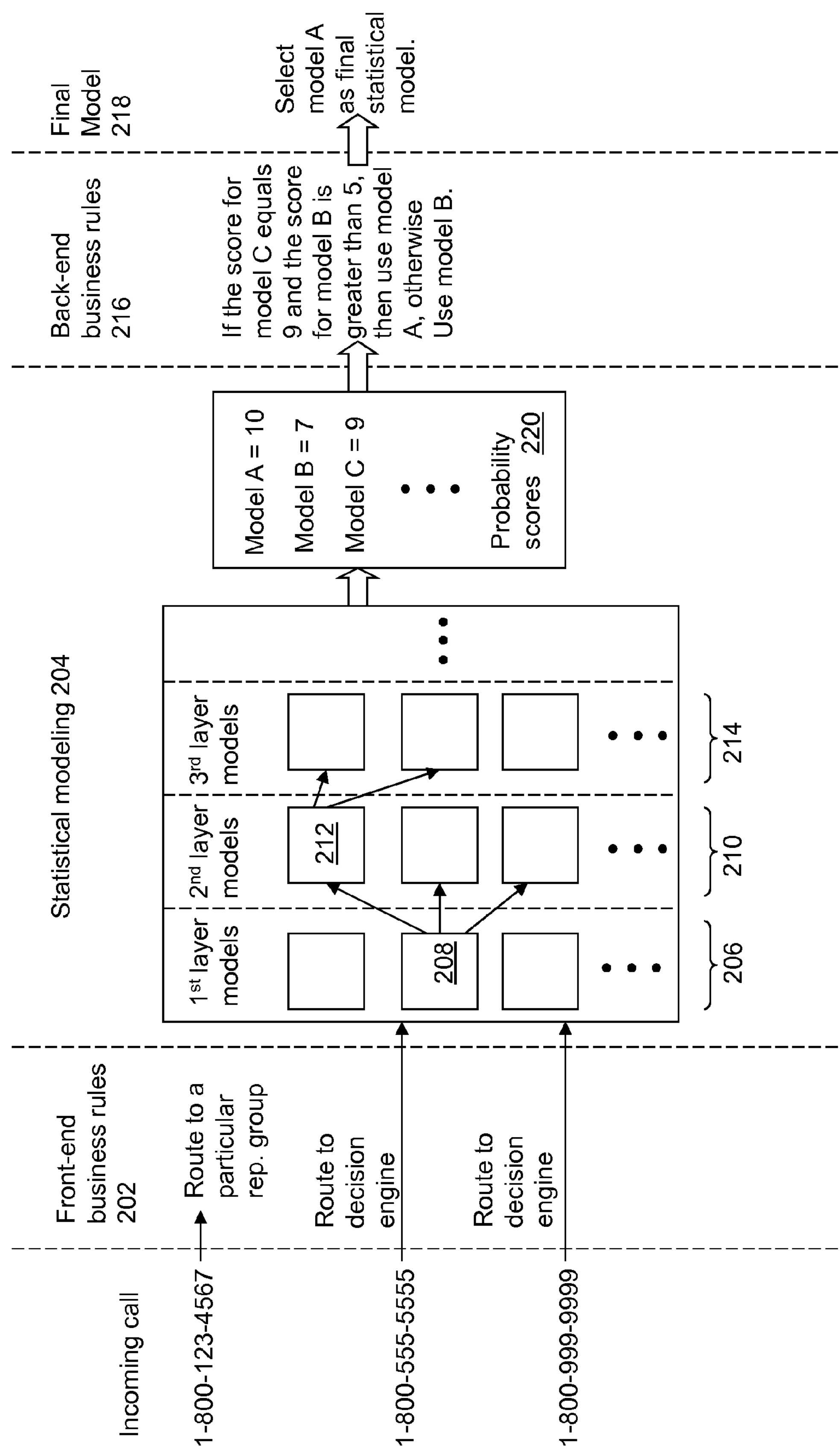
FIG. 3 is a diagram showing a signal flow for processing incoming calls.

FIG. 2 is a diagram of an example process 120 for routing a telephone call from the caller 102 to a representative 104. FIG. 3 is a diagram showing an example signal flow for processing incoming calls. Referring to FIGS. 2 and 3, the system 100 receives 122 a telephone 200 call from the caller 102. The system 100 processes 124 the telephone call 200 using front-end business rules 202, which may include, e.g., rules that provide initial routing of the call based on the phone number that was called.

For example, the system 100 may process toll-free numbers including 1-800-123-4567, 1-800-999-9999, and 1-800-555-5555. The front-end business rules 202 may specify that calls using the 1-800-123-4567 number should be routed directly to a particular group of representatives without being processed by the decision engine 106, whereas calls using the 1-800-999-9999 and 1-800-555-5555 should be processed by the decision engine 106 using statistical modeling 204.

If the front-end business rules 202 determine that the call should be processed by the decision engine 106, the decision engine 106 retrieves information from the customer database 108 and determines 126 probability scores for statistical models. Because there may be hundreds or thousands of models, to reduce computation time, the decision engine 106 may use a nested approach to reduce the number of statistical models that need to be analyzed.

In the nested approach, there are several layers of statistical models, each model being linked to one or more models in the next layer. The decision engine 106 analyzes statistical models in a first layer 206 and determines which one of the statistical models in the first layer has the highest score (e.g., in this example, the model 208 has the highest score). The decision engine 106 then analyzes statistical models in a second layer 210 that are linked to the model in the first layer 206 having the highest score, and determines which one of the statistical models in the second layer has the highest score (e.g., in this example, the model 212 has the highest score). The decision engine 106 then analyzes statistical models in a third layer 214 that are linked to the model in the second layer 210 having the highest score, and determines which one of the statistical models in the third layer has the highest score, and so forth, until there are no additional layers linked to the statistical model having the highest probability score.

At the end of the nested approach, the decision engine 106 generates a number of probability scores 220 associated with a number of statistical models. For example, the decision engine 106 may determine the scores:

Model A=10;

Model B=7;

Model C=9.

The decision engine 106 then applies 128 back-end business rules 216 to the probability scores 220 to select a final statistical model 218. For example, the back-end business rules 216 may specify, e.g., that if the score for model C equals 9 and the score for model B is greater than 5, then use model A, otherwise use model B. In the example above, model A is selected as the final statistical model 218.

As another example, a business rule 216 may indicate that, for a caller that meets certain criteria, model A should be used if the score is above 7, otherwise use model B if the score is above 5, and otherwise use model C. In the example above, the decision engine 106 determines that model A is the final statistical model 218.

The selected statistical model is mapped 130 to a skill and a proficiency level. The skill may be represented as a number, such as skill 39 or skill 10. The mapping can be performed using simple assignment rules, such as:

Model A=skill 59, proficiency 6;

Model B=skill 37, proficiency 4;

Model C=skill 10, proficiency 8.

In the example above, because model A is selected as the final model, the system 100 determines that skill 59 and proficiency 6 are required to provide service to the caller 102.

Figure 4:
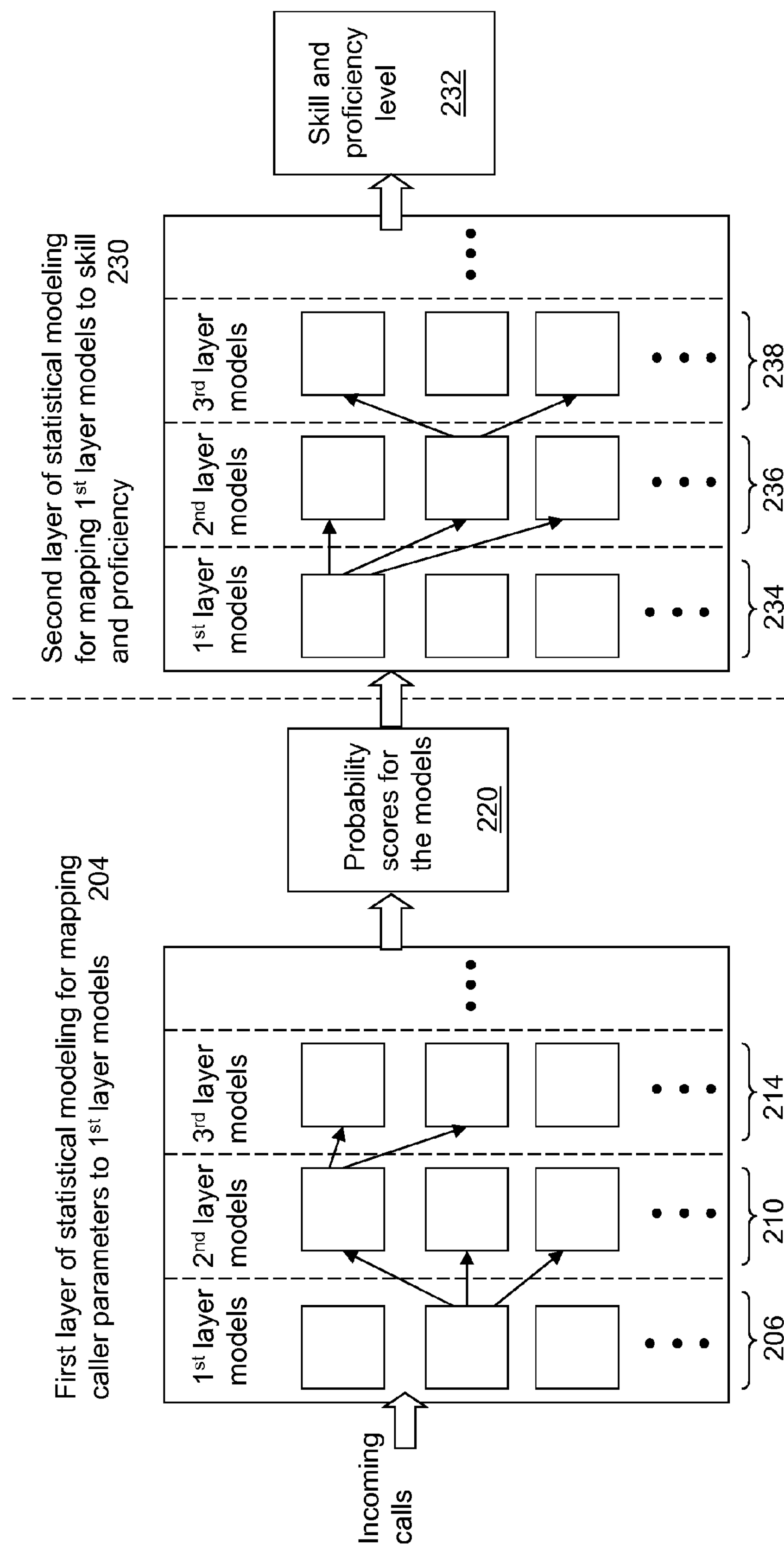
FIG. 4 is a diagram showing two levels of statistical modeling for determining a skill set and proficiency level to service a call.

Referring to FIG. 4, the mapping from the final model to a skill set and proficiency level can also be performed based on another layer of statistical modeling. The first layer of statistical modeling 204 maps an incoming call to an action (a reason for the call, such as to request information about retirement planning). The final statistical model (e.g., in the example of FIG. 3, model A is the final model) in the first layer of statistical modeling 204 and relevant parameters about the caller 102 may be used in a second layer of statistical modeling 230 to determine the skill set and proficiency level 232 that is required to service the caller 102. In other words, the second layer of statistical modeling 230 maps an action to a skill set and proficiency level.

For example, when model B is selected as the final statistical model is the first layer of statistical modeling 204, different skills and proficiency levels may be required depending on the customer's language preference, net worth, geographical location, and frequency of calls. For example, model B may represent customers who requested to open a stock brokerage account. Depending on the net worth of the caller 102, the call may be routed to a regular representative or a premium representative who is knowledgeable about opening stock brokerage accounts. Depending on the language preference of the caller 102, the call may be routed to a representative who speaks English or a representative who speaks Spanish who is knowledgeable about opening stock brokerage accounts.

The statistical models used in the second layer of statistical modeling will be referred to as second layer statistical models, as compared to first layer statistical models used in the first layer of statistical modeling. The first layer statistical models may include nested layers of statistical models, as shown in FIG. 3. The second layer statistical models are generated by reviewing past call records, finding calls that require a particular skill and proficiency level, and finding correlations between the skill and proficiency level and parameters of the user and the final first layer statistical model.

For example, the second layer statistical analyses 230 may determine that the parameters relevant to skill 59 and proficiency 9 include the final first layer statistical model, the language preference, and net worth. The parameters relevant to skill 13 and proficiency 4 include the final first layer statistical model, the net worth, and geographical location.

The second layer of statistical modeling may also use a nested approach to reduce the number of second layer statistical models that need to be analyzed. For example, the second layer of statistical modeling 230 may include first layer statistical models 234, second layer statistical models 236, and third layer statistical models 238, etc.

In performing the second layer statistical analyses, the decision engine 106 applies (or matches) parameters of the caller 102 with the second layer statistical models to determine probability scores for the second layer statistical models. Each second layer statistical model is associated with a skill and proficiency level. The second layer statistical model having the highest probability score is selected as the final second layer statistical model, and the skill and proficiency number associated with the final second layer statistical model are sent to the routing engine 112 to determine which representative to route the call.

Referring back to FIG. 2, the skill set and proficiency level is passed to the routing engine 112, which selects a representative 104 having the proper skill and proficiency level and routes 132 the call to the selected representative 104.

Figure 5:
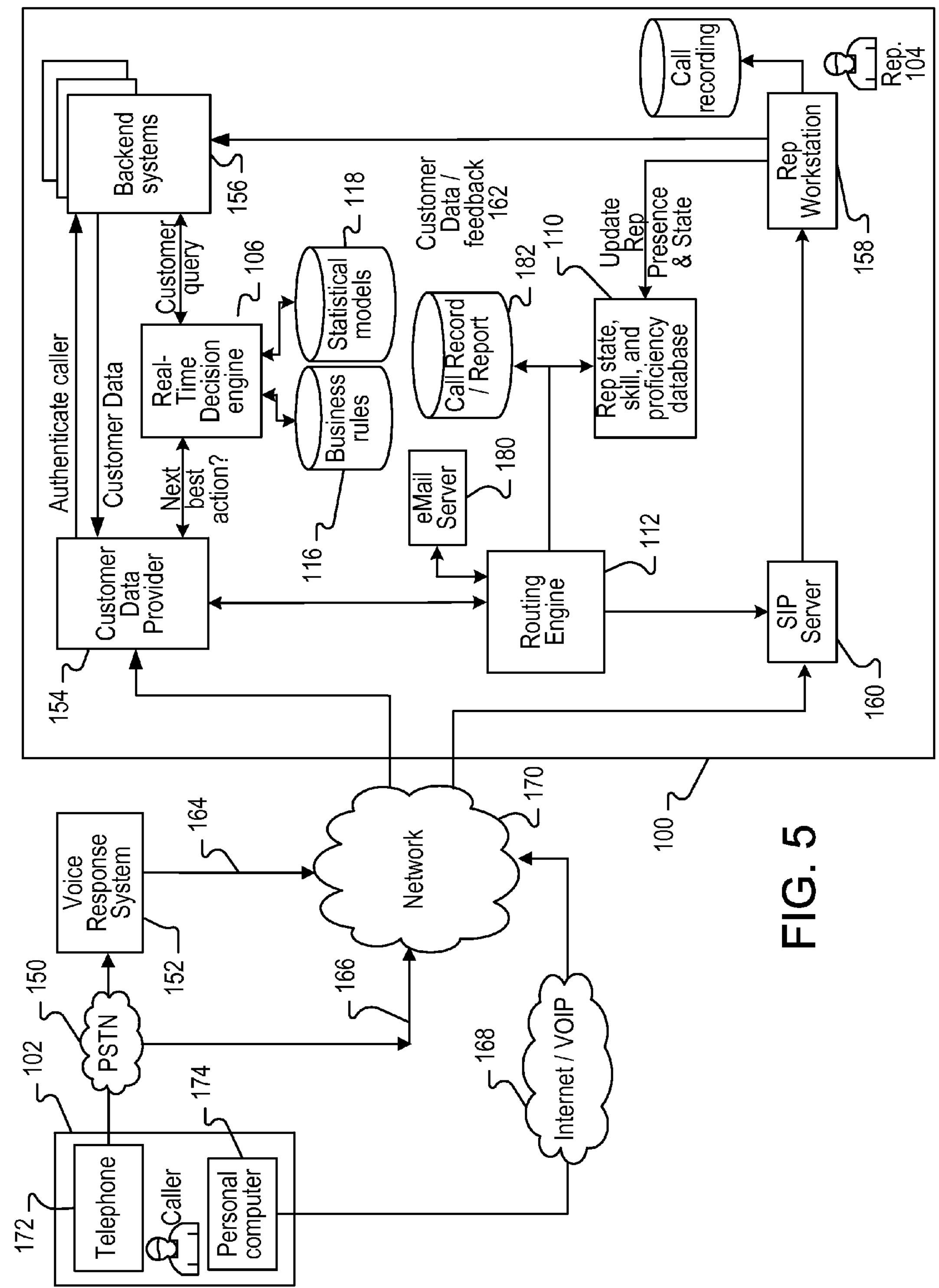
FIG. 5 is a block diagram of a predictive call routing system and an environment for operating the system.

FIG. 5 shows a more detailed diagram of the predictive call routing system 100 and other modules that are used to perform predictive call routing. A caller 102 can use a telephone 172 to call a customer service number of the company. The call is routed through a public switched telephone network (PSTN) 150 to an interactive voice response system 152, which announces a greeting message and asks for personal information from the caller 102, such as a name, an account number, and a password.

The voice response system 152 receives the caller's personal information and forwards the information to a customer data provider 154 through a path 164 and a network 170, which can be an Internet Protocol network. The customer data provider 154 accesses backend systems 156 to authenticate the identify of the caller 102.

The caller 102 can also use a personal computer 174 to call the customer service number of the company. In this case, the desktop computer 174 connects to the network 170 through the Internet/Voice over Internet Protocol (VoIP) 168.

The backend systems 156 can have multiple data sources having information stored in different formats, e.g., XML and non-XML formats ("XML" represents extensible markup language). The backend systems 156 may include databases of raw data and applications that query the databases and convert the retrieved raw data into a format that can be processed by other parts of the system 100.

The backend systems 156 store information about customers, e.g., personal information, transaction history, and account information, including or in addition to items listed in Table 1 above. Personal information can include, e.g., age, gender, marital status, number of children, and employer name. The account information can include, e.g., the type of account (e.g., savings account, stock brokerage account, mutual fund account, 401k account), and the dollar amount in the account. The transaction history can include, e.g., the date mat the account was opened, the last time that the customers called in with a service question, the date of last transaction, whether the customers' questions have been successfully resolved, and whether the customers had initiated web sessions to interact with representatives online.

The backend systems 156 can store, e.g., information about financial plans or accounts managed by the company, news articles related to the financial plans or accounts, and marketing campaign related to the financial plans or accounts.

The interactive voice response system 152 can, e.g., implement VoiceXML scripts when conducting a dialogue with the caller 102. The backend systems 156 can store information in a database in XML format. The backend systems 156 can also store information in a database using a non-XML format, and use applications to query the database and convert the information to XML format. The XML data can be received by the interactive voice response system 152 in determining what voice prompt to output during the course of a dialogue. The interactive voice response system 152 can include, for example, application software available from TellMe Networks, Inc., Mountain View, Calif.

After the identity of the caller 102 is authenticated, the customer data provider 154 queries the backend system 156 to obtain basic customer information. The customer data provider 154 may invoke the voice response system 152 to provide a voice menu providing options for the caller 102 to choose from. If the caller 102 selects an option to request, e.g., basic account information, the customer data provider 154 may retrieve the information from the backend systems 156 and provide the information to the caller 102.

If the caller 102 opts to speak to a human representative, the customer data provider 154 sends the basic customer information to the real-time decision engine 106. The decision engine 106 queries the backend systems 156 to obtain detailed customer information. Using the process 120 (FIG. 2) described above, the decision engine 106 uses both business rules 116 and statistical models 118 to determine a skill and proficiency level suitable for providing service to the caller 102.

The decision engine 106 informs the customer data provider 154 about the skill number and proficiency level. The customer data provider 154 sends the skill number and proficiency level to the routing engine 112, which can access the representative status and skill database 110 to determine which representatives 104 are available, as well as the skills of each representative 104 and the proficiency level with respect to each skill.

In some examples, when a customer service representative 104 comes to work, he/she logs on to the system 100 through a representative workstation 158, which updates the representative database 110 to show that the representative 104 is available. Thus, the routing engine 112 has information about which representatives 104 are available at any given time. The routing engine 112 can access the representative database 110 to determine which representatives 104 have a given skill, and the proficiency level. The routing engine 112 then selects a representative 104 having the appropriate skill and proficiency level based on a number of criteria, such as whether the representative 104 is currently logged on to the system 100, whether the representative 104 is busy helping other customers, and the length of time since the last time that the representative 104 has processed a similar problem for a customer. In addition to the criteria above, the routing engine 112 may select representatives in a way to maintain a freshness of training for the representative by distributing calls among representatives.

After finding an appropriate representative 104, the routing engine 112 sends routing information of the representative 104 to the PSTN 150 to cause the telephone call to be routed through a path 166 and the network 170 to a session initiation protocol (SIP) server 160 that connects to the workstation 158 of the representative 104.

The communications between the interactive voice response system 152 and the network 170, as well as the communications between the PSTN 150 and the network 170, can be based on multi-protocol label switching (MPLS) protocol.

If the representative 104 determines that he/she has the proper skills to service the caller 102, the representative 104 proceeds with solving the caller's problems. A call record and report database 182 stores a log of the call session, including information about, e.g., the parties participating the call, how the call was routed, the time and duration of call.

At the end of the session, the representative 104 sends feedback information 162 to the backend data systems 156, which stores the feedback information 162 in a record that is linked to the caller 102. The feedback information 162 can be a call record that includes, e.g., whether the problem was successfully solved, how the problem was solved, whether the caller 102 has any comments, and whether the problem could have been solved by automated systems instead of a human representative. The feedback information 162 also includes an indication that representative 104 has the proper skill set to service the caller 102.

On the other hand, if the representative 104 determines that he/she does not have the proper skill set to service the caller 102, he/she may look up a representative directory (e.g., stored in the backend systems 156) and route the call to another representative. The representative 104 then provides feedback information 162 indicating that he/she does not have the proper skills to service the caller 102, and that a second representative having a different skill set is more suitable for servicing the caller 102.

The feedback information 162 can be later used by the real-time decision engine 106 to update the statistical models 118. Positive feedback, i.e., feedback that indicates the predictive routing was successful, may cause the statistical models 118 to be adjusted such that calls from customers having similar backgrounds will more likely be matched with the skill and proficiency level previously predicted by the decision engine 106. Negative feedback, i.e., feedback indicating that the call was routed to a first representative not having the proper skills, and was subsequently routed to a second representative, may cause the statistical models 118 to be adjusted such that calls from customers having similar backgrounds will less likely be matched with the skill and proficiency level of the first representative, and will be more likely matched with the skill and proficiency level of the second representative.

In some examples, the decision engine 106 may determine that, rather than routing the call to a human representative, the caller 102 can be properly serviced by a machine generated voice message followed by an e-mail message. For example, the caller 102 may be interested in opening an account. The system 100 may generate a voice message asking whether the caller 102 would like to receive an application form via e-mail. If the caller 102 responds affirmatively, the routing engine 112 communicates with an e-mail server 180 so that an appropriate e-mail message is sent to the caller 102.

The Decision Engine and Statistical Models

The decision engine 106 may use a number of algorithms and techniques to establish the statistical models 118. For example, the decision engine 106 may use neural networks, a predictive modeling technique that uses artificial neural networks to model an underlying pattern. The decision engine 106 may use classification and regression trees (CART), an algorithm that uses a Gini index for its splitting criterion. The decision engine 106 may use CHAID algorithm, a decision tree splitting criterion based on a chi squared statistics formula, and AID heuristics that enables it to handle numerical data.

The decision engine 106 may use Kohonen Networks to map input vectors or patterns of arbitrary dimension N onto a discrete map with 1 or 2 dimensions. Patterns close to one another in the input space can be close to one another in the map, and the patterns can be topologically ordered. A Kohonen network includes a grid of output units and N input units. The input pattern is fed to each output unit. The input lines to each output unit are weighted. These weights are initialized to small random numbers.

The decision engine 106 may use a K-means algorithm, a learning algorithm that solves clustering problems. The algorithm performs the following steps. (1) K points are placed into a space represented by objects that are being clustered. These points represent initial group centroids. (2) Each object is assigned to the group that has the closest centroid. (3) When all objects have been assigned, recalculate the positions of the K centroids. (4) Repeat steps (2) and (3) until the centroids no longer move. This produces a separation of the objects into groups from which the metric to be minimized can be calculated.

The decision engine 106 may use a two-step algorithm. In a first step, cluster analysis is used to group cases into pre-clusters that are treated as single cases. Standard hierarchical clustering is then applied to the pre-clusters in a second step. This method is used when one or more of the variables are categorical (not interval or dichotomous). This method is a one-pass-through-the-dataset method and is recommended for large datasets.

The decision engine 106 may use an apriori algorithm, an association rule mining algorithm. The apriori algorithm uses breadth-first searches and uses a hash tree structure to count candidate item sets efficiently. The algorithm generates candidate item sets (patterns) of length k from k−1 length item sets. Then, the patterns that have an infrequent sub-pattern are pruned. According to the downward closure lemma, the generated candidate set contains all frequent k length item sets. Following that, the whole transaction database is scanned to determine frequent item sets among the candidates. For determining frequent items in a fast manner, the algorithm uses a hash tree to store candidate item sets. The apriori algorithm is designed to operate on databases containing transactions (e.g., collection of items bought by customers or details of a website frequentation).

The decision engine 106 may use a sequence analysis, which can be used to analyze a subsequent purchase of a product or products given a previous buy. For example, buying an extended warranty is more likely to follow (in that specific sequential order) the purchase of a TV or other electric appliances. Sequence analysis helps extract sequence rules.

The decision engine 106 may use linear regression, an algorithm that generates estimation models. The algorithm assumes that a linear relationship exists between independent variables and a response variable.

The decision engine 106 may use logistic regression, an algorithm that generates classification models. The target column may be non-binary, but most implementations use two value (binary) predictions.

Different types of statistical models 118 may be established using the algorithms described above. The statistical models 118 may include, e.g., Bayesian models.

The decision engine 106 may use a nested approach to analyze the statistical models 118. For each statistical model 118, the decision engine 106 applies the parameters associated with the caller that are relevant to the statistical model 118 to calculate a probability score for the model. The decision engine 106 may perform the statistical analyses within a time period specified by rules. For example, a rule may specify that for a certain types of customers, a prediction about the need of the customers and an identification of a skill set and proficiency level suitable for servicing the customer must be made within n seconds. The time period of n seconds is determined by taking into account a balance between fast response and accurate predictive routing.

In some examples, to establish the statistical models 118, the predictive call routing system 100 analyzes many (e.g., hundreds of thousands of) real calls from customers during a period of time (e.g., a number of weeks) and train the statistical models 118 to predict call reasons based on the actual outcomes of the calls. The dependent variables (or outputs) of the statistical models are the actual call reasons. A user of the system 100 can pre-select a number of call reasons for which the statistical models are to be trained to recognize. When a call is processed by a representative 104, the representative 104 selects an actual call reason from a menu and the actual call reason is recorded. The independent variables (or inputs) of the statistical models can be several (e.g., thousands of) customer data attributes, including call history, recent web visits, open work items, demographic, transactional, and account data. The system 100 analyzes the customer data attributes and determines which attributes are relevant to predicting the pre-selected call reasons.

Some of the actual calls can be used as a training set for training the statistical models, and some of the actual calls can be as a testing set for testing the accuracy of the statistical models. For the training set, all dependent and independent, variables are fed into system 100 to train the statistical models. Then, using the test set, the calls are fed into the system 100 one-by-one, along with the independent variables, and the decision engine's predictions are compared against the representative's selected call reason to gauge the engine's accuracy. If the decision engine 106 predicts the call reasons with an accuracy above a threshold, then the statistical models are considered to be sufficiently accurate to be useful in routing calls. The call reasons are then mapped to the required representative skills.

Different algorithms can be used for the decision engine 106, with varying degrees of accuracy. For example, the algorithms can include Bayesian, logistic regression, CHAID, information trees, decision trees, TreeNet®—available from Salford Systems, San Diego, Calif., and neural networks.

Examples of Predictive Routing

The call routing system 100 can be adapted to handle calls to companies in a broad range of industries, e.g., financial institutions, retailers, computer companies, telecommunications companies, air line companies. The statistical models can be adapted to enable the call routing system 100 to predict the needs of a broad range of callers and accurately route the calls to agents or representatives having appropriate skills for helping the callers. The statistical models can be updated based on information learned from each call so that future routing can be improved.

Below are examples of using the call routing system 100 to perform predictive routing under various scenarios. In the examples below, it is assumed that the call routing system 100 is operated by a company that provides financial products and services. Various assumptions will be made in each example with respect to the conditions of the customer prior to the call, as well as the actions taken by the customer during the call. The call routing system 100 can also handle situations different from the examples described below.

Example 1

In example 1, the call routing system 100 routes a call from a caller 102 to a representative 304 based on the caller's profile. The decision engine 106 determines a skill set that is required to handle the call, and the system 100 routes the call to a representative 104 or agent having the required skill set. The determination of what skill set is required to handle the call can be made before the interactive voice response system 152 presents a main menu to the caller 102, when the caller 102 selects a menu option, or when the caller 302 selects an option to speak with a human representative.

The following describes the steps that occur when a caller 102 calls a regular customer service number not associated with a marketing campaign. It is assumed that the caller 102 has a brokerage account, and the caller 102 has not yet been registered as an "active trader" even though he/she has made over a threshold number (e.g., 30) of trades in the past month.

Step 1: The caller 102 calls the regular customer service number.

Step 2: The customer data provider 154 authenticates the caller 102.

Step 3: The interactive voice response system 152 plays (broadcasts) a main menu to the caller 102.

Step 4: The caller 102 selects an option to transfer directly to a representative.

Step 5: The decision engine 106 queries the backend systems 156 and learns that, prior to the telephone call, the caller 102 has executed more than 30 trades in the last 30 days and has placed enough trades to be classified as an active trader.

Step 6: The decision engine 106 identifies, from among a plurality of options and based on probability, the representative skill set and proficiency level that are best suited to handle the call by using the business rules and statistical models described above. The identified skill set indicates that the representative needs to have skills for servicing active traders and has to be licensed in the customer's state of residence.

Step 7: The routing engine 112 searches the representative database 110 to find a suitable representative 104 available with the required skill set and proficiency level, and routes the call to the representative 104.

Step 8: When the representative 104 receives the call, the SIP server 160 sends a message to the representative workstation 158 to indicate that the caller 102 is an active trader.

The representative workstation 158 may include a graphical user interface that allows the representative 104 to request and receive information from the system 100. The messages sent to the representative workstation 158 may include background information of the caller 102, such as the caller's account information and a history of past transactions with the customer service. The messages may also include a prediction of the questions (as predicted by the decision engine 106) that may be raised by the caller 102, and scripts that are useful in answering the predicted questions.

Step 9: The representative 104 discusses with the caller 102 and answers the caller's questions. After the caller 102 receives the desired information, the caller 102 ends the telephone call.

Step 10: The representative 104 provides feedback 162 to the system 100 by updating a call record stored in the backend data systems 156 indicating that the representative 104 had the proper skills to handle the call, and that the caller 102 required the representative's particular skill for the interaction. For example, the call record may also indicate whether the caller 102 was satisfied with the service, and whether any follow-up actions should be performed. The call record can be sent to a customer relationship management system for use in improving customer relationships.

Step 11: The system 100 may update the statistical models used by the decision engine 106 based on the representative feedback to improve routing of future calls.

Example 2

The system 100 can predict that the caller 102 is calling about a question that is specific to the caller's home state. The system 100 can provide a separate skill classification for having a license in each jurisdiction (e.g., state or country that requires a license). In this example, it is assumed that, the caller 102 has an active account, and that the customer data provider 154 can provide information about the automatic number identification information (ANI) and home state of the caller 102.

The following describes the steps that occur when a caller 102 calls a customer service number, and the system 100 routes the call to a representative 104 based on the home state of the caller 102 rather than on the present location of the caller 102 (e.g., determined by the ANI).

Step 1: The caller 102 calls the customer service number and logs in using his/her social security number and personal identification number (PIN).

Step 2: After the main menu is played back, the caller 102 opts to transfer directly to a representative.

Step 3: The decision engine 106 queries the backend systems 156 to obtain information about the caller 102, including the ANI and home state of the caller 102, and determines that the caller 102 is calling into the system 100 from a phone in a state different from the customer's home state.

Step 4: The decision engine 106 predicts, from among a plurality of options and based on probability, a skill set and proficiency level that are best suited for servicing the caller 102 by using business rules and statistical models described above. The predicted skill set indicates that the representative needs to be licensed in the customer's home state.

Step 5: The routing engine 112 searches the representative database 110 to find a suitable representative 104 available with the required skill set and proficiency level, and routes the call to the representative 104.

Step 6: When the representative 104 receives the call, the SIP server 160 sends a message to the representative workstation 158 to indicate that the caller 102 may be asking about a question that is specific to the caller's home state.

Step 7: Same as steps 9-11 of example 1.

Example 3

The system 100 can predict that a caller 102 is calling about questions related to a statement, recently sent to the caller 102, and routes the telephone call to a representative 104 having relevant skills.

The following describes the steps that occur when the caller 102 calls a customer service number to ask about a recently received statement. It is assumed that the caller 102 has an active account, the backend systems 156 have information about whether customers have signed up for online statements and when the statements were sent to the customers.

Step 1: Same as steps 1 and 2 of example 2.

Step 2: The decision engine 106 queries the backend systems 156 and learns that the caller 102 has not signed up for online statements, and that a statement was mailed to the caller 102 two days ago. The decision engine 106 predicts, from among a plurality of options and based on probability, a representative skill set and proficiency level that are best suited to handle the call by using business rules and statistical models described above. The skill set indicates that the representative needs to have the skills for handling general account questions.

Step 3: The routing engine 112 searches the representative database 110 to find a suitable representative 104 available who has the skill for handling general account questions, and routes the call to the representative 104.

Step 4: When the representative 104 receives the call, the SIP server 160 sends a message to the representative workstation 158 to indicate that the caller 102 recently received a statement and may ask questions about the statement.

Step 5: Same as steps 9-11 of example 1.

Example 4

Example 4 is similar to example 3, except that the caller 102 signed up for online statements. This example assumes that the caller 102 calls the same day that an electronic statement was e-mailed to the caller 102. The following describes the steps that occur when the caller 102 calls a customer service number to ask about a recently received statement.

Step 1: Same as steps 1 and 2 of example 2.

Step 2: The decision engine 106 queries the backend systems 156 and learns that the caller 102 has signed up for online statements, and that the company has e-mailed an electronic statement to the caller 102 the same day that the call was received. The decision engine 106 predicts, from among a plurality of options and based on probability, a representative skill set and proficiency level that are best suited to handle the call by using business rules and statistical models described above. The skill set indicates that the representative needs to have the skills for answering general account questions and general on-line transaction questions.

Step 3: The routing engine 112 searches the representative database 110 to find a suitable representative 104 who has the skill set and proficiency level for answering general account questions and general on-line transaction questions, and routes the call to the representative 104.

Step 4: When the representative 104 receives the call, the SIP server 160 sends a message to the representative workstation 158 to indicate that the caller 102 recently received an on-line statement and may ask questions about the on-line statement or other on-line transaction questions.

Step 5: Same as steps 9-11 of example 1.

Example 5

The system 100 can predict that a caller 102 is calling about a recent mutual fund purchase and route the telephone call to a representative 104 having relevant skills.

The following describes the steps that occur when the caller 102 calls a customer service number to ask about a recent mutual fund purchase. It is assumed that the backend systems 156 have information about recent mutual fund purchases by customers.

Step 1: Same as steps 1 and 2 of example 2.

Step 2: The decision engine 106 queries the backend systems 156 and learns that, the caller 102 purchased a mutual fund within the past 24 hours. The decision engine 106 identifies, from among a plurality of options and based on probability, a representative skill set and proficiency level that is best suited to handle the call by using business rules and statistical models described above. The predicted skill set indicates that the representative needs to have expertise in mutual funds.

Step 3: The routing engine 112 searches the representative database 110 to find a suitable representative 104 available who has the skill set and proficiency level identified by the decision engine 106, and routes the call to the representative 104.

Step 4: When the representative 104 receives the call, the SIP server 160 sends a message to the representative workstation 158 to indicate that the caller 1.02 has recently purchased a mutual fund and may ask questions about mutual funds.

Step 5: Same as steps 9-11 of example 1.

Example 6

The system 100 can predict that a caller 102 is calling to open an individual retirement account (IRA) after receiving mailed marketing materials, and routes the telephone call to a representative 104 having the skills to resolve questions related to IRAs.

The following describes the steps that occur when the caller 102 calls a customer service number with questions about IRA. It is assumed that the caller 102 has an active account, and that the backend systems 156 have information about marketing materials sent to customers 128 and the dates that the materials were sent.

Step 1: Same as steps 1 and 2 of example 2.

Step 2: The decision engine 106 queries the backend systems 156 and learns that an IRA-related marketing message was sent to the caller 102 three days ago. The decision engine 106 identifies, from among a plurality of options and based on probability, a representative skill set and proficiency level that is best suited to handle the call by using business rules and statistical models described above. The predicted skill set indicates that the representative needs to have skills for assisting customers in opening an IRA over the phone.

Step 3: The routing engine 112 searches the representative database 110 to find a suitable representative 104 available who has the skill set and proficiency level predicted by the decision engine 106, and routes the call to the representative 104.

Step 4: When the representative 104 receives the call, the SIP server 160 sends a message to the representative workstation 158 to indicate that the caller 102 recently received IRA-related marketing messages and may have questions about IRAs or wish to open an IRA.

Step 5: Same as steps 9-11 of example 1.

Example 7

The system 100 can predict that a caller 102 is calling to seek guidance about a stock brokerage account, and routes the telephone call to a representative 104 having relevant skills.

The following describes the steps that occur when the caller 102 calls a customer service number with questions about the stock brokerage account. It is assumed that the caller 102 has an active brokerage account, and the date of the call is not the last 4 weeks prior to the end of the tax season.

Step 1: Same as steps 1 and 2 of example 2.

Step 2: The decision engine 106 queries the backend systems 156 and learns that the caller 102 is a male, has an age between 35 to 50, has assets between $100,000 to $500,000 managed by the company, has an average transaction history of n1 trades per year, and has not called recently (e.g., has not called within n2 days). The decision engine 106 predicts, from among a plurality of options and based on probability, the representative skill set and proficiency level that are best suited to handle the call by using business rules and statistical models described above. The predicted skill set indicates that the representative needs to have the skills for guiding a customer on managing stock portfolios.

Step 3: The routing engine 112 searches the representative database 110 to find a suitable representative 104 available with the skill set and proficiency level predicted by the decision engine 106 and routes the call to the representative 104.

Step 4: When the representative 104 receives the call, the SIP server 160 sends a message to the representative 104 to indicate that the caller 102 has a stock brokerage account and may need guidance on managing his/her stock portfolio.

Step 5: Same as steps 9-11 of example 1.

Example 8

The system 100 can predict that a customer is calling to seek guidance about retirement, and routes the telephone call to a representative 104 having relevant skills.

The following describes the steps that occur when the caller 102 calls a customer service number to ask about financial issues related to retirement. It is assumed that the customer has an active account, the day of the call is not within the last 4 weeks prior to the end of the tax season, and it is not within 1 week of an expected delivery of an account statement.

Step 1: Same as steps 1 and 2 of example 2.

Step 2: The decision engine 106 queries the backend systems 156 and learns that the caller 102 (1) has assets between $100,000 and $500,000, (2) has an average transaction history of n1 trades per year, (3) is not a frequent caller (e.g., has not called within the past n2 days), and (4) the caller 102 was in a web session with a registered investment advisor at a designated web site in the past 24 hours, but abandoned mid-session.

Step 3: The decision engine 106 predicts, from among a plurality of options and based on probability, the representative skill set and proficiency level that are best suited to handle the call by using business rules and statistical models described above. The identified skill set indicates that the representative needs to have skills of retirement guidance.

Step 4: The routing engine 112 searches the representative database 110 to find a suitable representative 104 available with the predicted skill set and proficiency level, and routes the call to the representative 104.

Step 5: When the representative 104 receives the call, the SIP server 160 sends to the representative 104 a message that includes the caller's background information, and indicates that the caller 102 may need guidance on retirement.

Step 6: Same as steps 9-11 of example 1.

Example 9

The system 100 can predict that a caller 102 is calling with questions about minimum required distribution, and routes the telephone call to a representative 104 having relevant skills.

The following describes the steps that occur when the caller 102 calls a customer service number and asks about minimum required distribution. It is assumed that the caller 102 has an active account, the day of the call is not the last 4 weeks prior to the end of the tax season, and it is not within 1 week of an expected delivery of an account statement.

Step 1. Same as steps 1 and 2 of example 2.

Step 2: The decision engine 106 queries the backend systems 156 and learns that the caller 102 is in the age range 65 to 71, has assets in the range $100,000 to $500,000, is not a frequent caller (e.g., has not called within the past n days), and that the current time of year is January to April.

The decision engine 106 predicts, from among a plurality of options and based on probability, the representative skill set and proficiency level that are best suited to handle the call by using business rules and statistical models described above. The decision engine 106 recognizes that the caller 102 is at the right age to inquire about initial minimum required distribution. The identified skill set indicates that the representative needs to have skills of retirement guidance and have knowledge about initial minimum required distribution.

Step 3: The routing engine 112 searches the representative database 110 to find a suitable representative 104 available with the predicted skill set and proficiency level, and routes the call to the representative 104. When the representative 104 receives the call, the SIP server 160 sends to the representative 104 a message indicating that the caller may need guidance on retirement, and may have questions about minimum required distribution.

Step 4: Same as steps 9-11 of example 1.

Responding to Calls Using Automated Systems

In some examples, the decision engine 106 may determine that the caller 102 is a frequent caller, and that much of the information requested by the caller 102 are readily available through the interactive voice response system 152 or web channels. When the system 100 routes a call to a representative, the system 100 can send a message to the representative 104 to indicate that the information requested by the caller 102 is likely available through the interactive voice response system 152 or web channels, and that the representative 104 should encourage the caller 102 to use alternative methods for obtaining information.

In some examples, the decision engine 106 may determine that the telephone call can be handled without routing the call to a representative 104. For example, the decision engine 106 may determine that machine generated voice messages can be played to the caller 102 through the interactive voice response system 152. The machine generated messages can include the specific information that the caller 102 needs, or can refer the caller 102 to designated web sites. The decision engine 106 may also determine that the caller 102 can be serviced by outbound e-mails that include information useful to the caller 102.

In some examples, the decision engine 106 can determine that no representative is currently available, and there are no other suitable methods for servicing the caller 102. The system 100 can generate a personalized message to provide to the caller 102 through the interactive voice response system 152 while the caller 102 waits for a representative. In some examples, the system 100 can generate a voice message to tell the customer that a representative will call back at a later time, and prompt the customer to provide a time and date for the representative to call back.

The examples 1 to 9 above represent cases in which the customer has a direct relationship with a company that operates the call routing system 100. For example, the customer may have a savings account with a bank, or the customer may have a stock-brokerage account with an investment bank.

In some examples, a first company (e.g., an employer services company) may provide services to employees of a second company (e.g., an employer), such as providing human resources and benefits services through the administration of retirement programs, pension programs, health and welfare programs, and payroll programs of the second company.

The examples 10 to 17 below describe situations in which an employer services company uses the call routing system 100 to route calls from employees of the employer having questions about the products and services provided by the employer services company.

Example 10

The call routing system 100 can route calls from a caller 102 who is a former employee (who recently changed jobs) to a representative 104 having the skills for answering the former employee's questions and skills for customer retention.

In example 10, it is assumed that the caller 102 previously worked for an employer in which the employer services company managed the employer's retirement and pension plans. The caller 102 recently changed jobs and no longer has an active account with the employer services company. The caller 102 is thinking about closing out his/her 401k account managed by the employer services company, and transferring the money to another company's IRA. The caller 102 has over $500,000 in his/her 401k account. The call comes in during a fairly low volume period.

The following describes the steps that occur when the caller 102 calls a customer service number and asks about his 401k account. It is assumed that the employer services company has recently sent the caller 102 certain documents outlining possible options for rolling over his/her 401k to an IRA managed by the employer services company. The caller 102 does not have another account or other relationships with the employer services company.

Step 1: Same as steps 1 and 2 of example 2.

Step 2: The decision engine 106 queries the backend systems 156 and learns that the caller 102 has a large amount of assets in a previous plan, has recently left his/her employer and may be looking to rollover his/her 401k account. The decision engine 106 identifies, from among a plurality of options and based on probability, the representative skill set and proficiency level that are best suited to provide service to the caller 102 using business rules and statistical models described above. The identified skill set indicates that the representative needs to have knowledge about 401k accounts, and should have the skills of account retention.

Step 3: The routing engine 112 searches the representative database 110 to select a suitable representative 104 available with the identified skill set and proficiency, and routes the call to the selected representative 104.

Step 4: When the representative 104 receives the call, the SIP server 160 notifies the representative 104 that the caller 102 has recently received a mailing from the employer services company about rollovers and may be looking to rollover his/her money outside of the employer services company.

Step 5: The representative 104 converses with the caller 102, and confirms that the caller 102 is thinking about transferring his/her fund outside of the employer services company. The representative 104 convinces the caller 102 to set up an IRA with the employer services company, and rollover his/her 401k into the IRA. This way, the caller's assets are retained in plans managed by the employer services company.

Step 6: The representative 104 provides feedback to the system 100 by adding or updating a call record stored in the backend data systems 156 indicating that the representative 104 had the proper skills to handle the call, and that the caller 102 required the representative's particular skill for the interaction. The call record indicates success in retaining the caller 102 as a continuing customer and retaining his/her assets within plans managed by the employer services company. The call record data can be sent to a customer relationship management system for use in improving customer relationships.

Step 7: Same as step 11 of example 1.

Example 11

The system 100 can automatically route a call from a customer to a priority service team that can usually be reached using a priority customer service number, in which the customer dialed in using a normal customer service number.

The following describes the steps that occur when the caller 102 calls the normal customer service number. It is assumed that (1) the caller's status with the employer services company is active, (2) the caller 102 has called customer service a week earlier, the call was routed to a regular customer service representative, then transferred to a priority service team representative, (3) the priority service team representative had opened a service ticket to resolve the caller's problem, and gave the caller 102 a special toll free number to call back, (4) the caller 102 forgot the special toll free number and called back using the normal toll free customer service number, and (5) the ticket is still open.

Step 1: Same as steps 1 and 2 of example 2.

Step 2: The decision engine 106 queries the backend systems 156 and recognizes that the caller 102 has recently called and was transferred from a regular customer service representative to a priority service team representative, a service ticket was created, and the ticket is still open.

Step 3: The decision engine 106 predicts, from among a plurality of options and based on probability, the representative skill set and proficiency level that are best suited to handle the call by using business rules and statistical models described above. The predicted skill set indicates that the call should be handled by a representative of the priority service team.

Step 4: The routing engine 112 searches the representative database 110 to find a suitable priority service team representative 104 who is available and routes the call to the representative 104.

Step 5: When the representative 104 receives the call, the SIP server 160 notifies the representative 104 that the caller 102 has recently called and that a service ticket is still open.

Step 6: The representative 104 handles the call and updates the service ticket accordingly.

Step 7: Same as steps 10-11 of example 1.

Example 12

In this example, the call routing system 100 determines that it is more useful to route the caller 102 to the interactive voice response application 240 rather than to a representative 104. The interactive voice response application 240 can be, e.g., a VoiceXML application that directs interactions or dialogues between the interactive voice response system 152 and the caller 102.

The following describes the steps that occur when a frequent caller calls a customer service number. It is assumed that (1) the caller 102 has an active account, (2) the call is placed outside of the open enrollment period specified by the caller's employer, (3) the participant calls at least n times per week, and (4) the caller's frequent calling pattern is recent.

Step 1: Same as steps 1 and 2 of example 2.

Step 2: The decision engine 106 queries the backend systems 156 and learns that (1) the caller 102 has an active account, (2) the call is placed outside of the open enrollment period specified by the caller's employer, (3) the participant calls at least n times per week, where n is a preset threshold value, and (4) the caller's frequent calling pattern is recent.

The decision engine 106 recognizes that the caller 102 matches the profile of a frequent caller 102 requesting information available via the interactive voice response application 240 or web channels. The decision engine 106 determines that it is best to service the caller 102 using the interactive voice response system 152. The decision engine 106 makes the determination based on business rules and statistical models.

Step 3: The interactive voice response application 240 notifies the caller 102 that most account information is available through an interactive voice response application or web channels, and proceeds with a tutorial.

Step 4: During the tutorial, the caller 102 selects an option provided by the interactive voice response application 240.

Step 5: The caller 102 decides to end the telephone call.

Step 6: The Interactive voice response application 240 informs the system 100 that the caller 102 listened to part or all of the tutorial and disconnected.

Step 7: The system 100 records information about the transaction and indicates that the caller 102 received useful information. The system 100 learns from the call to improve future routing of calls.

Example 13

The system 100 can determine that it is beneficial to provide a tutorial to the caller 102 by using the interactive voice response application 240 before transferring the call to a representative 104.

The following describes the steps that occur when a frequent caller calls a customer service number and is processed by the call routing system 100. It is assumed that (1) the caller 102 has an active account, (2) the call is placed outside of the open enrollment period specified by the caller's employer, and (3) the participant calls at least n times per week.

Step 1: Same as steps 1 and 2 of example 2.

Step 2: The decision engine 106 queries the backend systems 156 and learns that (1) the caller 102 has an active account, (2) the call is placed outside of the open enrollment period specified by the caller's employer, and (3) the participant calls at least n times per week.

The decision engine 106 recognizes that the caller 102 matches the profile of a frequent caller 102 requesting information available via the interactive voice response application 240 or the web channels. The decision engine 106 determines that it is best to service the caller 102 using the interactive voice response application 240 or web channels. The decision engine 106 makes the determination based on business rules.

Step 3: The system 100 invokes the interactive voice response application 240, which notifies the participant that most account information is available via the interactive voice response application 240 or the web channels, and proceeds with a tutorial.

Step 4: The caller 102 listens to the tutorial

Step 5: At the conclusion of the tutorial, the caller 102 opts to speak with a representative.

Step 6: The system 100 recognizes that the caller 102 has been categorized as a frequent caller 102, has heard the tutorial, and is requesting to speak to a representative.

Step 7: The decision engine 106 predicts, from among a plurality of options and based on probability, the representative skill set and proficiency level that are best suited to handle the call by using business rules and statistical models described above.

Step 8: The routing engine 112 searches the representative database 110 to find a suitable representative 104 having the required skill set, and routes the call to the representative 104.

Step 9: When the representative 104 receives the call, the SIP server 160 sends a message to the representative 104 to indicate that the caller 102 is a frequent caller and should be encouraged to use alternate channels. The representative 104 is made aware that the caller 102 had heard the tutorial provided by the interactive voice response application 240 as part of this call.

Step 10: The representative 104 uses a script to review the use of alternate channels prior to servicing the caller 102.

Step 11: The representative 104 discusses with the caller 102.

Step 12: The representative 104 provides feedback by entering a call record to be stored in the backend data systems 156 indicating that he/she had the proper skills to handle the call and that the caller 102 could have used the interactive voice response application 240 or web channels to obtain the required information. The call record can be sent, to the customer relationship management system.

Step 13: The system 100 uses the call record to improve routing of future calls Example 14

The system 100 can determine that high net worth customers (e.g., customers having large amounts of assets being managed by the employer services company) can be routed to non-premium representatives for handling basic requests. In some examples, a high net worth customer is serviced by a premium representative who has more experience and knowledge. However, sometimes the high net worth customer may have basic requests that can be serviced by regular representatives. If the routing system transfers the call to a premium representative, it would be impolite for the premium representative to then transfer the call to a regular representative just because the request is basic and does not need the particular skills of the premium representative. If the routing system can accurately predict that the call is likely related to a basic request and route the call to a regular representative, this may enable the premium representatives to work on other more challenging tasks.

The following describes the steps that occur when a high net worth customer calls a customer service number. It is assumed that the caller 102 has an active account, and has recently married.

Step 1: Same as step 1 of example 2.

Step 2: After the main menu is played back, the caller 102 selects an "add beneficiary" option and is transferred to a representative.

Step 3: The decision engine 106 queries the backend systems 156 and learns that the caller 102 is a high net worth customer and has recently married. The system 100 also knows that the caller 102 wishes to make changes to beneficiary information. The decision engine 106 predicts, from among a plurality of options and based on probability, a skill set and proficiency level that are best suited for servicing the caller 102 by using business rules and statistical models described above.

Step 4: The routing engine 112 searches the representative database 110 to find a suitable representative 104 available with the predicted skill set and proficiency level, and routes the call accordingly.

Step 5: When the representative 104 receives the call, the SIP server 160 notifies the representative 104 that the caller 102 wishes to change his/her beneficiary information.

Step 6: The representative 104 converses with the caller 102, updates the caller's beneficiaries. After the beneficiaries are updated, the caller 102 ends the telephone call.

Step 7: Same as steps 10 and 11 of example 1.

Example 15

The system 100 can determine that a call is related to recent news articles that discuss a particular financial plan that the caller 102 has participated in, and route the call to a representative 104 having relevant skills associated with the plan.

The following describes the steps that occur when a caller 102 calls a customer service number and asks about a plan mentioned in recent news articles. It is assumed that the backend systems 156 have information about which financial plans are impacted by news articles. The impacted financial plans are flagged with an alert status. The system 100 has identified skill sets to deal with issues related to the financial plans that have been flagged with the alert status.

Step 1: Same as step 1 of example 2.

Step 2: The decision engine 106 queries the backend systems 156 and learns that the caller 102 participates in a financial plan that has been flagged with the alert status. The interactive voice response system 152 provides the caller 102 with an option for a direct transfer to a representative who is knowledgeable about the financial plan.

Step 3: The caller 102 did not select the option for direct transfer, so the generic menu is played to the caller 102. The caller 102 opts to speak to a representative.

Step 4: The decision engine 106, based on the caller's account information and knowledge that the financial plan that the caller 102 participated in was the topic of recent news articles, predicts a skill set and proficiency level that are best suited for servicing the caller 102 by using business rules and statistical models described above.

Step 5: The routing engine 112 searches the representative database 110 to find a suitable representative 104 available with the predicted skill set and proficiency level, and routes the call to the representative 104.

Step 6: When the representative 104 receives the call, the SIP server 160 sends a message to the representative 104 to indicate that the caller 102 may be calling about a financial plan that is the topic of recent news articles.

Step 7: Same as steps 9-11 of example 1.

The call routing system 100 can provide offers or messages for a representative 104 to communicate to a caller 102 about adjustments of existing plans or starting new plans.

For example, based on stored information about the caller 102, the decision engine 106 may determine that the caller 102 is not deferring enough to maximize his/her employer's match amount. The system 100 generates a message for the representative 104 to engage in a conversation with the caller 102 about increasing his/her deferral percentage.

For example, the decision engine 106 identifies up-sell or cross-sell opportunities based on the information about the caller 102, and generates specific offers or messages based on the up-sell or cross-sell opportunities. The SIP server 160 can send the offers or messages to the representative 104 to facilitate up-sell or cross-sell when the opportunity comes.

As another example, when a caller 102 calls the customer service, the decision engine 106 may determine that the caller 102 has a recent change of marital status but no recent changes to beneficiary information. The system 100 may provide a message to the representative 104, suggesting a discussion with the caller 102 about updating the caller's beneficiary information.

Example 16

The system 100 can identify that a call is likely related to an inquiry about the status of a recently submitted 401k loan request, and determine that the call can be handled by the interactive voice response application 240.

The following describes the steps that occur when a caller 102 calls a customer service number to inquiry about the status of a recently submitted 401k loan request. It is assumed that the caller's status with the employer services company is active, the caller 102 is in good standing with his/her employer, and the caller 102 has enough money to cover the loan.

Step 1: Same as steps 1 and 2 of example 2.

Step 2: The decision engine 106 queries the backend systems 156 and learns that the caller 102 has submitted a 401k loan application, and there is information about the status of the application that the caller 102 may be interested in.

Step 3: The interactive voice response application 240 notifies the caller 102 that the system recognizes he/she has submitted a 401k loan application, and offers him/her the option of hearing an update of the status of his/her loan application.

Step 4: The caller 102 selects the option of hearing an update of the status of the loan.

Step 5: The interactive voice response application 240 provides the status of the loan application through the interactive voice response system 152 and offers the caller 102 the option to return to the main menu or to speak with a representative.

Step 6: The caller 302 chooses to hang up.

Step 7: The interactive voice response application 240 informs the system 100 that the caller 102 accepted the option of hearing about the status of the loan application and disconnected after the status was provided.

Step 8: The system 100 records a successful transaction, and uses the record to improve processing of future calls.

Example 17

In some examples, after the caller 102 hears about the status of his/her application, he/she still opts to speak to a representative.

The following describes the steps that occur when a caller 102 calls a customer service number to ask about a loan application. In example 17, similar to example 16, it is assumed that the caller's status with the employer services company is active, the caller 102 is in good standing with his/her employer, and the caller 102 has enough money to cover the loan.

Step 1: Same as steps 1-5 of example 16.

Step 2: The caller 102 opts to speak with a representative.

Step 3: The system 100 recognizes that the caller 102 has selected the option to listen to an automated update about the status of the loan application, and is requesting to speak to a representative.

Step 4: The decision engine 106 predicts, from among a plurality of options and based on probability, a skill set and proficiency level that are best suited for servicing the caller 102 by using business rules and statistical models described above. The predicted skill set indicates that the representative needs to have the skills for answering questions about loan applications, and should have a familiarity with the general policies of the employer.

Step 5: The routing engine 112 searches the representative database 110 to find a suitable representative 104 who is available with the predicted skill set and proficiency, and routes the call to the representative 104.

Step 6: When the representative 104 receives the call, the SIP server 160 notifies the representative 104 that the caller 102 has recently applied for a loan and has heard the loan application status provided by the interactive voice response application 240. The SIP server 160 sends information about the loan application status to the representative 104.

Step 7: The representative 104 and the caller 102 converse about the loan application. After the caller 102 receives the desired information, the caller 102 ends the telephone call.

Step 8: Same as Steps 10 to 11 of example 1.

Figure 6:
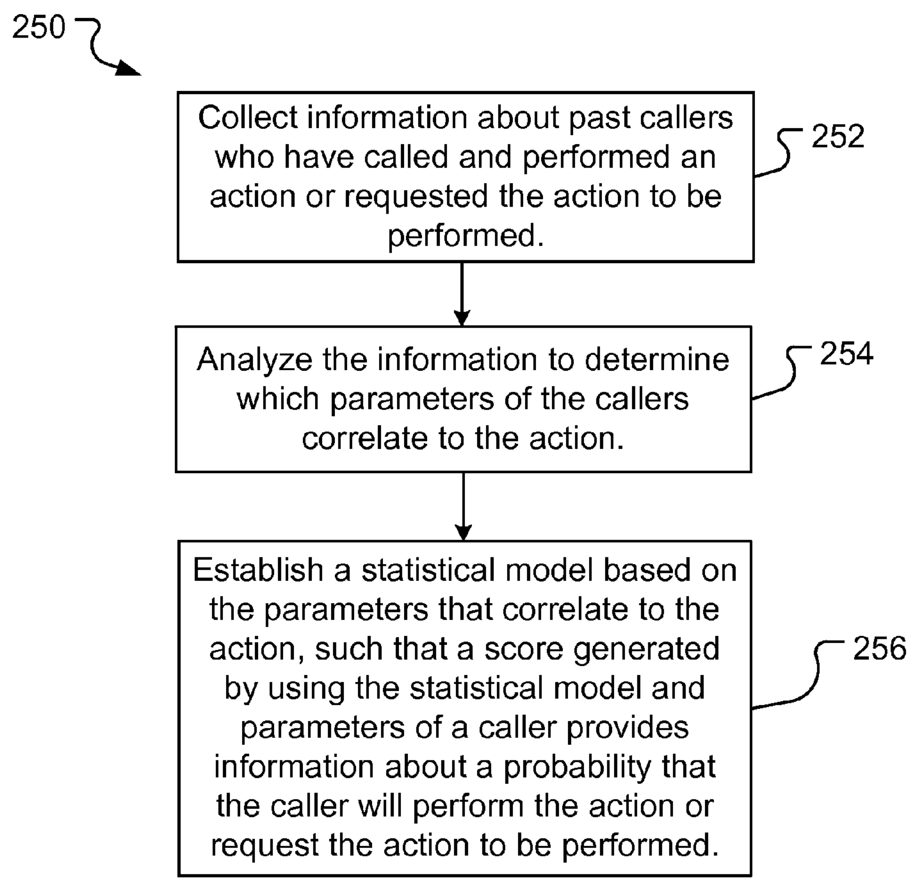
FIG. 6 is a flow diagram of an example process for establishing statistical models.

Referring to FIG. 6, a process 250 can be used to establish statistical models. For example, the process 250 collects information about past callers who have called one or more specified telephone numbers and performed an action or requested the action to be performed (252). The process 250 analyzes the information to determine which parameters of the callers correlate to the action. The process 250 establishes a statistical model based on the parameters that correlate to the action, such that a score generated by using the statistical model and parameters of a caller provides information about a probability that the caller will perform the action or request the action to be performed. For example, the process 250 can be performed by the system 100 (FIG. 1).

Figure 7:
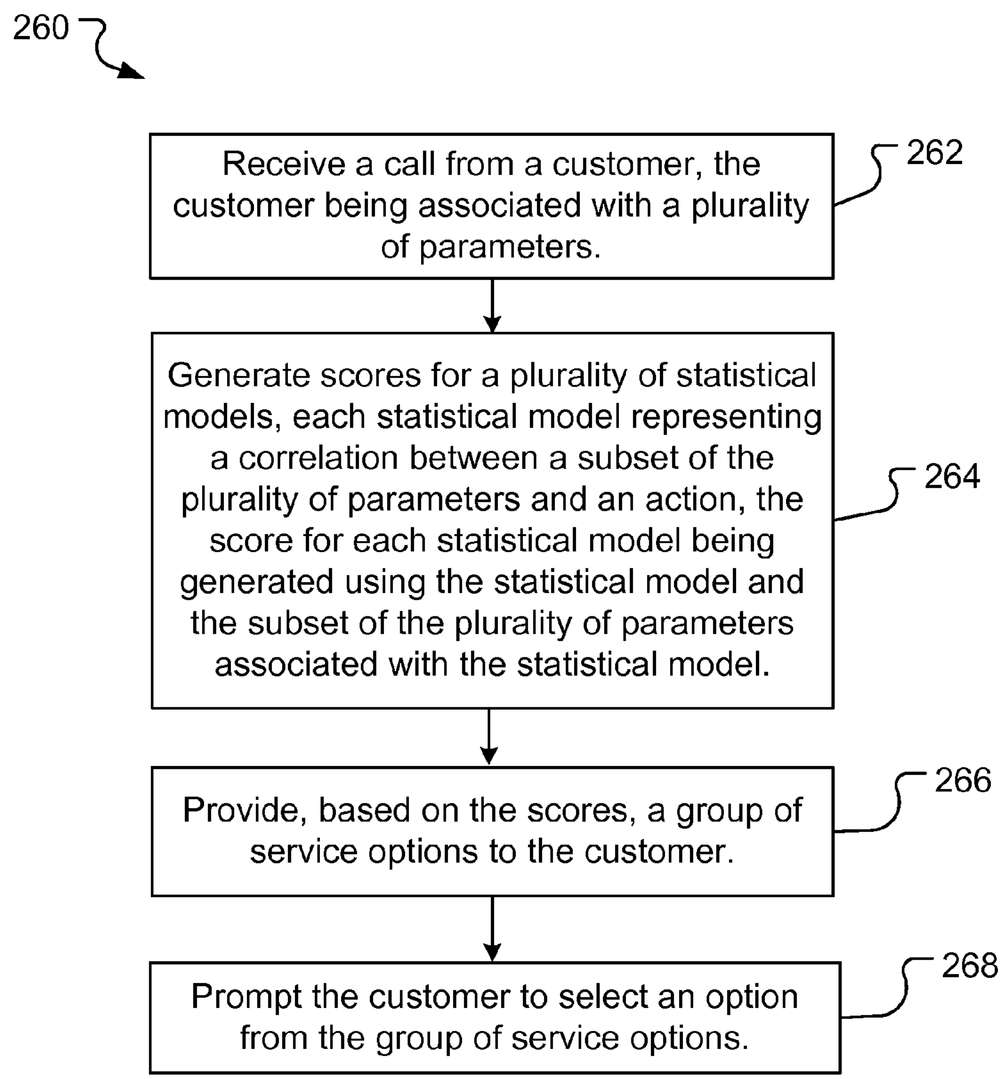
FIG. 7 is a flow diagram of an example process for providing service options for a caller based on statistical modeling.

Referring to FIG. 7, a process 260 can be used to provide service options for a caller based on statistical modeling. For example, the process 260 receives a call from a customer, the customer being associated with a plurality of parameters (262). The process 260 generates scores for a plurality of statistical models, each statistical model representing a correlation between a subset of the plurality of parameters and an action. The score for each statistical model is generated using the statistical model and the subset of the plurality of parameters associated with the statistical model (264). The process 260 provides, based on the scores, a group of service options to the customer (266). The process 260 prompts the customer to select an option from the group of service options (268). For example, the process 260 can be performed by the system 100 (FIG. 1).

Figure 8:
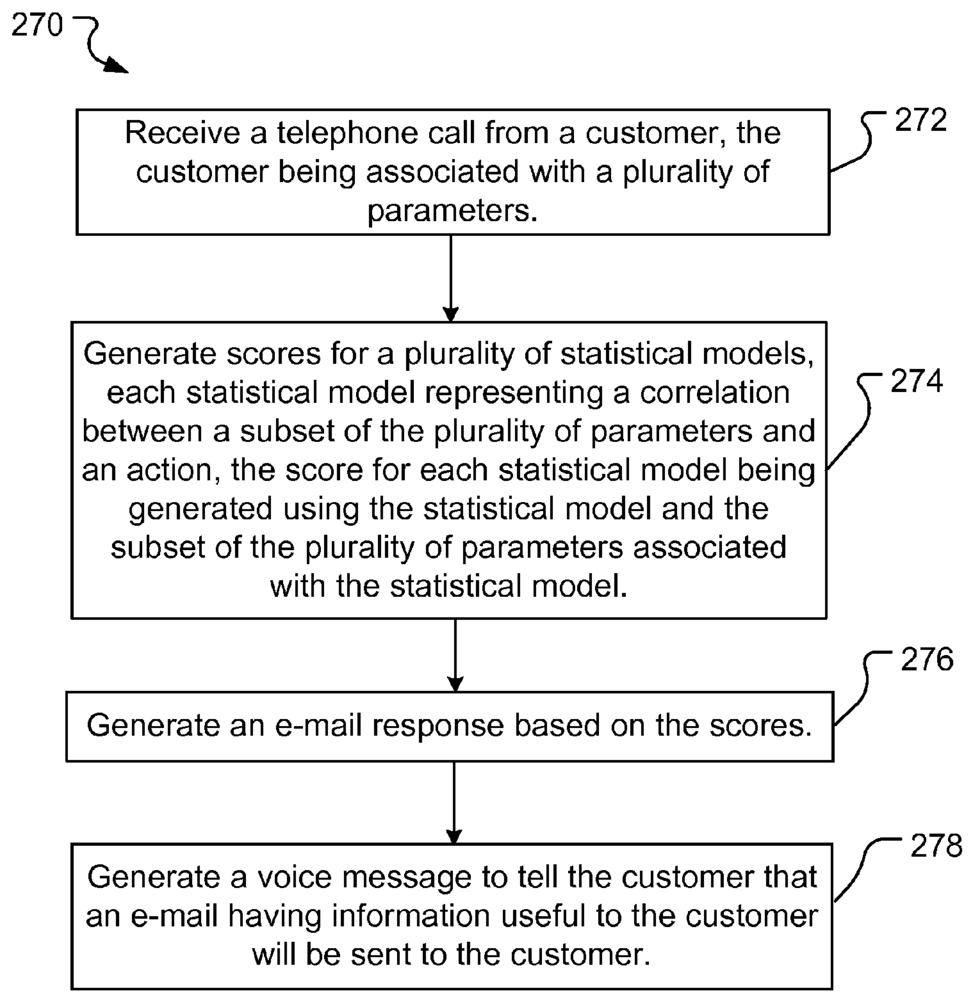
FIG. 8 is a flow diagram of an example process for providing an e-mail response based on statistical modeling.

Referring to FIG. 8, a process 270 can be used to provide an e-mail response based on statistical modeling. For example, the process 270 receives a telephone call from a customer, the customer being associated with a plurality of parameters (272). The process 270 generates scores for a plurality of statistical models, each statistical model representing a correlation between a subset of the plurality of parameters and an action. The score for each statistical model is generated using the statistical model and the subset of the plurality of parameters associated with the statistical model (274). The process 270 generates an e-mail response based on the scores (276). The process 270 generates a voice message to tell the customer that an e-mail having information useful to the customer will be sent to the customer (278). For example, the process 270 can be performed by the system 100 (FIG. 1).

Figure 9:
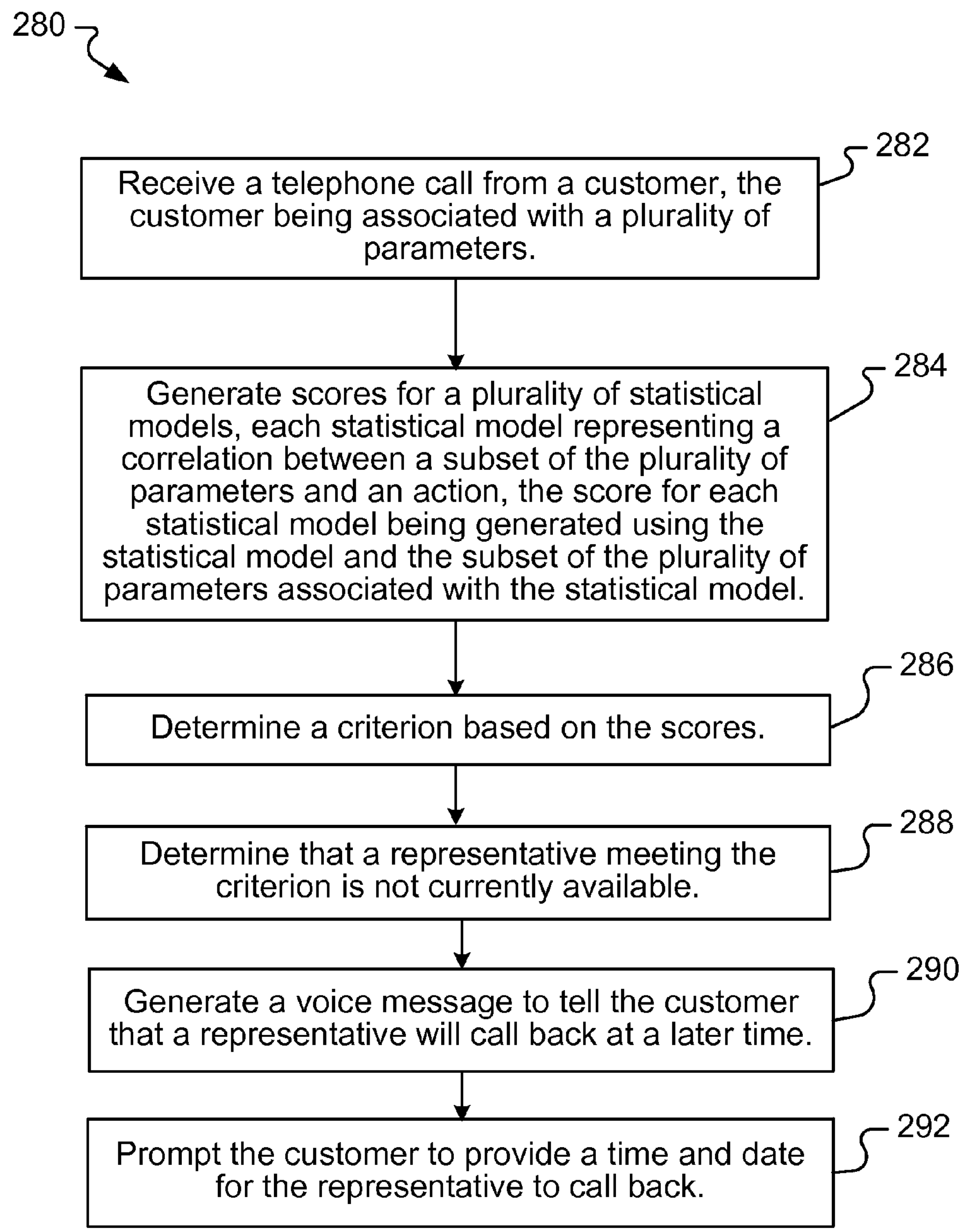
FIG. 9 is a flow diagram of an example process for determining that a representative having the skills for servicing a caller is not available and providing a message to the caller.

Referring to FIG. 9, a process 280 can be used to determine that a representative having the skills for servicing a caller is not available and provide a message to the caller. For example, the process 280 receives a telephone call from a customer, the customer being associated with a plurality of parameters (282). The process 280 generates scores for a plurality of statistical models, each statistical model representing a con-elation between a subset of the plurality of parameters and an action. The score for each statistical model is generated using the statistical model and the subset of the plurality of parameters associated with the statistical model (284). The process 280 determines a criterion based on the scores (286). The process 280 determines that a representative meeting the criterion is not currently available (288). The process 280 generates a voice message to tell the customer that a representative will call back at a later time (290). The process 280 prompts the customer to provide a time and date for the representative to call back (292). For example, the process 280 can be performed by the system 100 (FIG. 1).

Figure 10:
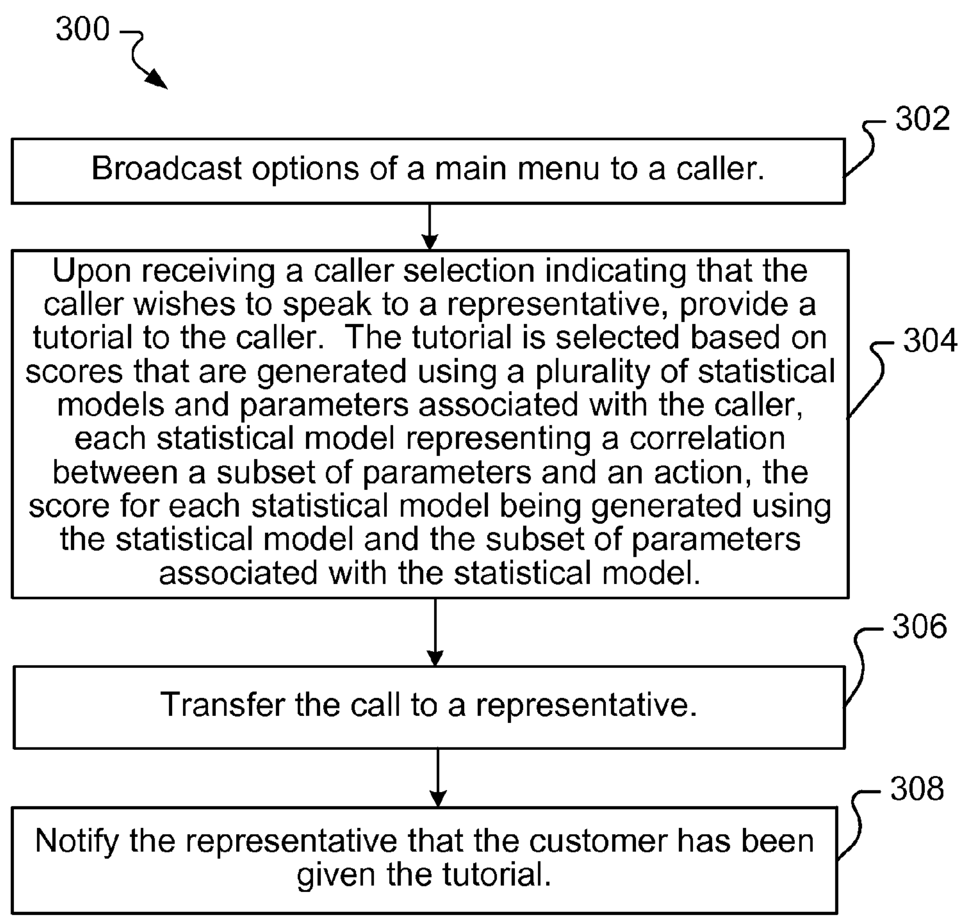
FIG. 10 is a flow diagram of an example process for providing a tutorial to a caller in which the tutorial is selected based on statistical modeling.

Referring to FIG. 10, a process 300 can be used to provide a tutorial to a caller (customer) in which the tutorial is selected based on statistical modeling. For example, the process 300 broadcasts options of a main menu to the caller (302). The process 300, upon receiving a caller selection indicating that the caller wishes to speak to a representative, provides a tutorial to the caller. The tutorial is selected based on scores that are generated using a plurality of statistical models and parameters associated with the caller, each statistical model representing a correlation between a subset of parameters and an action. The score for each statistical model is generated using the statistical model and the subset of parameters associated with the statistical model (304). The process 300 transfers the call to a representative (306). The process 300 notifies the representative that the customer has been given the tutorial (308). For example, the process 300 can be performed by the system 100 (FIG. 1).

Figure 11:
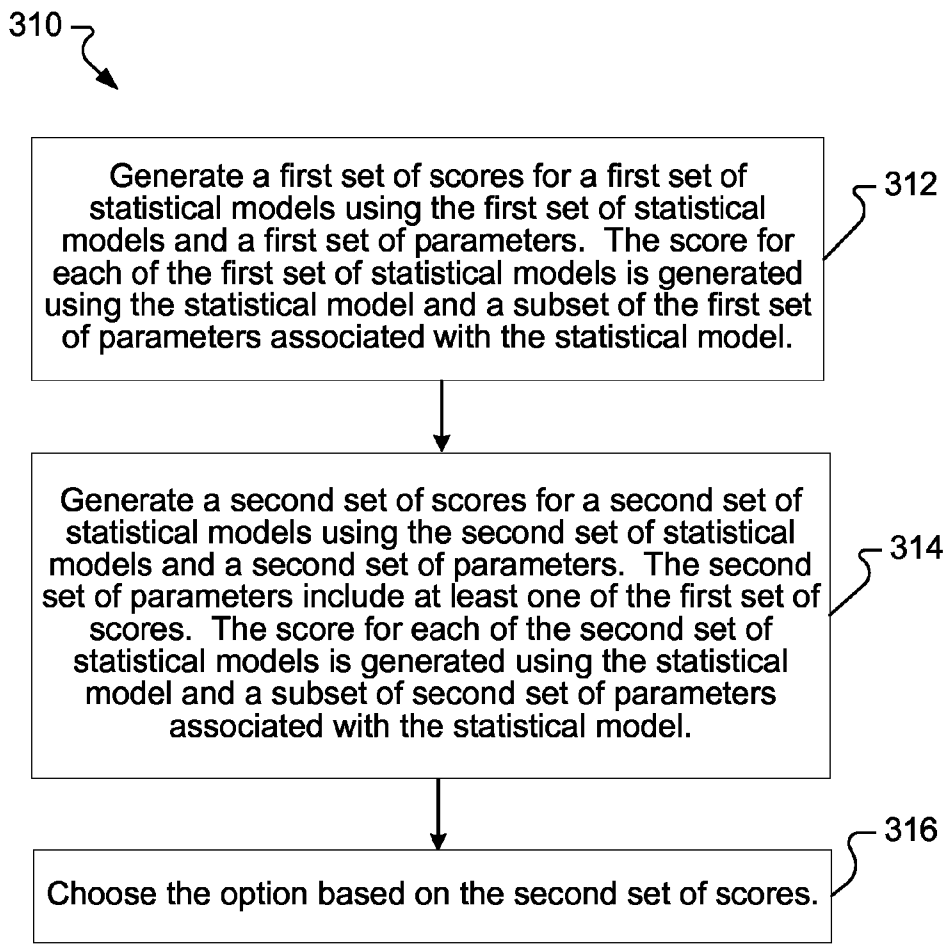
FIG. 11 is a flow diagram of an example process for choosing an option out of a plurality of options based on at least two layers of statistical modeling.

Referring to FIG. 11, a process 310 can be used to choose an option out of a plurality of options based on at least two layers of statistical modeling. For example, the process 310 generates a first set of scores for a first set of statistical models using the first set of statistical models and a first set of parameters. The score for each of the first set of statistical models is generated using the statistical model and a subset of the first set of parameters associated with the statistical model (312). The process 310 generates a second set of scores for a second set of statistical models using the second set of statistical models and a second set of parameters. The second set of parameters include at least one of the first set of scores. The score for each of the second set of statistical models is generated using the statistical model and a subset of second set of parameters associated with the statistical model (314). The process 310 chooses the option based on the second set of scores (314). For example, the process 310 can be performed by the system 100 (FIG. 1). The first layer of statistical modeling can be used to map a call from a customer to an action to be requested or performed by the customer. The second layer of statistical modeling can be used to map the action to a skill and proficiency level that is useful in servicing the customer.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine readable storage device, a machine readable storage substrate, a memory device, a composition of matter effecting a machine readable propagated signal, or a combination of one or more of them.

The term "data processing apparatus" encompasses ail apparatus, devices, and machines for processing data, including by way of example a programmable processor, a computer, or multiple processors or computers. The apparatus can include, in addition to hardware, code that creates an execution environment for the computer program in question, for example, code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit, suitable for use in a computing environment. A computer program does not necessarily correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, for example, an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, for example, magnetic, magneto optical disks, or optical disks. However, a computer need not have such devices.

Computer readable media suitable for storing computer program instructions and data include all forms of non volatile memory, media and memory devices, including by way of example semiconductor memory devices, for example, EPROM, EEPROM, and flash memory devices; magnetic disks, for example, internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, for example, a CRT (cathode ray tube) or a flat panel display, such as a LCD (liquid crystal display) monitor, for displaying information to the user and a keyboard and a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input.

Embodiments of the subject matter described in this specification can be implemented in a computing system that includes a back end component for example, as a data server, or that includes a middleware component, for example, an application server, or that includes a front end component, for example, a client computer having a graphical user interface or a Web browser through which a user can interact with an implementation of the subject matter described is this specification, or any combination of one or more such back end, middleware, or front end components. The components of the system can be interconnected by any form or medium of digital data communication, for example, a communication network. Examples of communication networks include a local area network ("LAN") and a wide area network ("WAN"), for example, the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

For example, the PSTN 150 and the network 170 can be replaced with any type of network, such as a private network, an intranet, or Internet. The modules (such as the decision engine 106 and routing engine 112) in FIGS. 1 and 5 can be implemented in software or hardware. The information about customers and representatives can be stored in any type of recording medium. The communications between the caller's personal computer and the system 100 can follow any of various types of communications protocol, e.g., session initiation protocol (SIP), real time transport protocol (RTP), and hypertext transfer protocol (HTTP), and secured hypertext transfer protocol (HTTPS).

In some examples, the system 100 may determine that, instead of routing the call to a human representative, it may be feasible to provide a customized set of service options that are tailored based on predicted needs of the caller. Statistical modeling is used to predict the intent of the caller. The caller is then presented with customized menu options that are configured based on the predicted intent of the caller. This way, the user can select an appropriate option quickly without going through nested layers of menus.

In the description above, the statistical modes are associated with actions. The decision engine generates scores for the statistical models, selects one statistical model based on the scores, maps the skill associated with the selected statistical model to a skill, then selects a representative having the skill. In some examples, each statistical model can be associated with a skill, so that selecting a statistical model based on the scores also selects a skill. In some examples, each statistical model can be associated with a representative, so that selecting the statistical model based on the scores also selects a representative. Because not every representative may be available, the decision engine may generate a list of representative candidates based on the scores, and the routing engine selects one representative from the list based on availability of the representatives.

What is claimed is:

1. A method comprising:

at a call routing system, receiving a telephone call from a caller, the caller being associated with a plurality of parameters;

predicting an action prior to caller input about the action, including generating scores for a plurality of statistical models, each statistical model representing a correlation between a subset of the plurality of parameters and an action, the score for each statistical model being generated using the statistical model and the subset of the plurality of parameters associated with the statistical model, the score for each statistical model providing information about a probability that the caller will perform an action associated with the statistical model or request the action to be performed;

selecting a representative based on the scores; and routing the call to the selected representative.

2. The method of claim 1 wherein selecting a representative comprises selecting a statistical model based on the scores and predetermined rules.

3. The method of claim 2 wherein selecting a representative comprises mapping the selected statistical model to a skill, and selecting the representative based on the skill.

4. The method of claim 3 wherein the skill is useful in performing the action.

5. The method of claim 3 wherein mapping the selected statistical model to a skill comprises using predetermined rules to map the selected statistical model to a skill.

6. The method of claim 3 wherein mapping the selected statistical model to a skill comprises using a second layer of statistical analyses, the second layer of statistical analyses comprising generating a second set of scores for a plurality of second statistical models, each second statistical model being associated with a skill, and mapping the selected statistical model to the skill based on the second set of scores.

7. The method of claim 1 wherein the statistical models are derived from information collected on people who have previously called using telephone numbers that are handled by the call routing system.

8. The method of claim 7 wherein the statistical model associated with a particular action is derived by finding previous calls that are associated with the particular action, and analyzing parameters of the callers to determine which subset of parameters correlate to the particular action.

9. The method of claim 1 wherein generating scores for the plurality of statistical models comprises generating scores for some of the statistical models, in which the statistical models comprise nested layers of statistical models, each model being linked to one or more models in the next layer.

10. The method of claim 1 wherein the action comprises at least one of requesting information, opening an account, updating account information, and performing a transaction with respect to an account.

11. The method of claim 1, further comprising receiving a feedback indicating whether it was proper to route the call to the selected representative.

12. The method of claim 11, further comprising updating the statistical models based on the feedback.

13. The method of claim 1, further comprising generating and broadcasting a personalized message to the caller while placing the caller on hold and waiting for a representative, wherein the personalized message is generated based on the scores.

14. The method of claim 1 wherein the parameters associated with the caller comprises at least one of age of the caller, gender of the caller, marital status of the caller, assets in the caller's account, number of previous calls from the caller within a predetermined number of days, number of days since a promotional material was sent to the caller, whether the caller has visited particular web pages, and language preferences of the caller.

15. The method of claim 1, further comprising searching a database having information about representatives, skills of the representatives, and proficiency of the representatives with respect to the skills.

16. The method of claim 1 wherein the parameters comprise whether the caller has a financial plan that is the subject of a news article published within a predetermined number of days.

17. The method of claim 1 wherein the selection of a representative is intended to maintain a freshness of training for the representative by distributing calls among representatives.

18. A method comprising:

collecting information about past callers who have called one or more specified telephone numbers and performed an action or requested the action to be performed;

analyzing the information to determine which parameters of the callers correlate to the action;

establishing a statistical model based on the parameters that correlate to the action, wherein a score that is generated by using the statistical model and parameters of a caller provides information about a probability that the caller will perform the action or request the action to be performed;

at a call routing system, receiving a telephone call from a caller of the telephone call, the caller being associated with a plurality of parameters; and predicting, using the statistical model and other statistical models, an action prior to caller input about the action.

19. A method comprising:

receiving a call from a customer, the customer being associated with a plurality of parameters;

predicting an action prior to customer input about the action, including generating scores for a plurality of statistical models, each statistical model representing a correlation between a subset of the plurality of parameters and an action, the score for each statistical model being generated using the statistical model and the subset of the plurality of parameters associated with the statistical model, the score for each statistical model providing information about a probability that the customer will perform an action associated with the statistical model or request the action to be performed;

providing, based on the scores, a subset of most likely service options to the customer; and prompting the customer to select an option from the subset of service options.

20. A method comprising:

receiving a telephone call from a customer, the customer being associated with a plurality of parameters;

predicting an action prior to customer input about the action, including generating scores for a plurality of statistical models, each statistical model representing a correlation between a subset of the plurality of parameters and an action, the score for each statistical model being generated using the statistical model and the subset of the plurality of parameters associated with the statistical model, the score for each statistical model providing information about a probability that the customer will perform an action associated with the statistical model or request the action to be performed;

generating an e-mail response based on the scores; and generating a voice message to tell the customer that an e-mail having information useful to the customer will be sent to the customer.

21. A method comprising:

receiving a telephone call from a customer, the customer being associated with a plurality of parameters;

predicting an action prior to customer input about the action, including generating scores for a plurality of statistical models, each statistical model representing a correlation between a subset of the plurality of parameters and an action, the score for each statistical model being generated using the statistical model and the subset of the plurality of parameters associated with the statistical model, the score for each statistical model providing information about a probability that the customer will perform an action associated with the statistical model or request the action to be performed;

determining a criterion based on the scores; and determining that a representative meeting the criterion is not currently available.

22. The method of claim 21, comprising generating a voice message to tell the customer that a representative will call back at a later time.

23. The method of claim 22, comprising prompting the customer to provide a time and date for the representative to call back.

24. A method comprising:

receiving a call from a customer;

broadcasting options of a main menu to the customer;

upon receiving a customer selection indicating that the customer wishes to speak to a representative, predicting an action prior to caller input about the action, providing a tutorial to the customer based on the prediction, the tutorial selected based on scores that are generated using a plurality of statistical models and parameters associated with the customer, each statistical model representing a correlation between a subset of parameters and an action, the score for each statistical model being generated using the statistical model and the subset of parameters associated with the statistical model, the score for each statistical model providing information about a probability that the caller will perform an action associated with the statistical model or request the action to be performed;

transferring the call to a representative; and notifying the representative that the customer has been given the tutorial.

25. A method comprising:

determining a skill of a representative for servicing a customer using two layers statistical modeling, wherein the first layer of statistical modeling provides estimations of actions that the customer is likely to perform or request to be performed before the customer provides input about the actions, the first layer of statistical modeling involving generating scores for a plurality of statistical models in the first layer, in which the score for each statistical model in the first layer provides information about a probability that the caller will perform an action associated with the statistical model or request the action to be performed, and the second layer of statistical modeling provides estimations of skills that are likely useful in performing the actions.

26. The method of claim 25, further comprising determining a proficiency level of the skill also using the two layers statistical modeling.

27. A method comprising:

choosing one option out of a plurality of options based on at least two layers of statistical modeling that comprises generating a first set of scores for a first set of statistical models using the first set of statistical models and a first set of parameters, the score for each of the first set of statistical models being generated using the statistical model and a subset of the first set of parameters associated with the statistical model, the score for each statistical model providing information about a probability that a user will perform an action associated with the statistical model or request the action to be performed;

selecting a score from among the first set of scores prior to receiving input from the user about an action associated with the statistical model corresponding to the score;

generating a second set of scores for a second set of statistical models using the second set of statistical models and a second set of parameters, the second set of parameters including the selected score from the first set of scores, the score for each of the second set of statistical models being generated using the statistical model and a subset of second set of parameters associated with the statistical model; and choosing the option based on the second set of scores.

28. The method of claim 27 wherein choosing one option from among the plurality of options comprises selecting a representative from among a plurality of representatives, the selected representative having the skill and proficiency level for servicing a caller.

29. A system comprising:

a real-time decision engine to receive information about a caller and identify a skill that is useful for providing service to the caller, the caller being associated with a plurality of parameters, the decision engine identifying the skill by predicting an action prior to caller input about the action, including generating scores for a plurality of statistical models, each statistical model representing a correlation between a subset of the plurality of parameters and an action that may be performed or requested to be performed by the caller, the score for each statistical model being generated using the statistical model and the subset of the plurality of parameters associated with the statistical model, the score for each statistical model providing information about a probability that the caller will perform an action associated with the statistical model or request the action to be performed, and identifying a skill based on the scores;

a storage to store the statistical models; and a call router to route a call from the customer to a representative who has the skill.

30. The system of claim 29, further comprising a storage to store a database having information about customers.

31. The system of claim 29, further comprising a storage to store a database having information about representatives and skills associated with the representatives.

32. The system of claim 29 wherein the decision engine is configured to establish a statistical model associated with a particular action by finding previous calls that are associated with the particular action, and finding parameters of callers to determine which subset of parameters correlate to the particular action.

33. The system of claim 29 wherein the plurality of statistical models comprise nested layers of statistical models, each model being linked to one or more models in the next layer.

34. The system of claim 29 wherein identifying the skill based on the scores comprises using a second layer of statistical modeling to determine the skill based on the scores.

35. The system of claim 34 wherein the second layer of statistical modeling comprises generating scores for a second set of plurality of statistical models, each of the second set of statistical models representing a correlation between a statistical model in the first layer, a subset of the plurality of parameters, and a skill that may be useful for providing service to the caller that performs or requests the action associated with the statistical model in the first layer.

36. A call routing system comprising:

a real-time decision engine to receive information about a caller and identify a group of service options that are useful to the caller, the caller being associated with a plurality of parameters, the decision engine identifying the service options by predicting an action prior to caller input about the action, including generating scores for a plurality of statistical models, each statistical model representing a correlation between a subset of the plurality of parameters and an action that may be performed or requested to be performed by the caller, the score for each statistical model being generated using the statistical model and the subset of the plurality of parameters associated with the statistical model, the score for each statistical model providing information about a probability that the caller will perform an action associated with the statistical model or request the action to be performed, and identifying a subset of most likely service options based on the scores;

a storage to store the statistical models; and an interactive voice response system to provide the subset of most likely service options to the caller and prompt the caller to select one of the service options.

37. The system of claim 29 in which the real-time decision engine uses feedback indicating whether it was proper to route the call to the representative to update the statistical models.

* * * * *